(12) United States Patent
Okuno

(10) Patent No.: US 10,170,743 B2
(45) Date of Patent: Jan. 1, 2019

(54) SEPARATOR AND NONAQUEOUS ELECTROLYTE BATTERY, AND BATTERY PACK, ELECTRONIC APPARATUS, ELECTRIC VEHICLE, ELECTRIC POWER STORAGE DEVICE, AND ELECTRIC POWER SYSTEM

(75) Inventor: Moriaki Okuno, Miyagi (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 809 days.

(21) Appl. No.: 13/437,661

(22) Filed: Apr. 2, 2012

(65) Prior Publication Data

US 2012/0268072 A1    Oct. 25, 2012

(30) Foreign Application Priority Data

Apr. 21, 2011   (JP) ................. 2011-095487

(51) Int. Cl.
*H01M 2/16*     (2006.01)
*H01M 10/052*   (2010.01)
*H01M 10/0587*  (2010.01)

(52) U.S. Cl.
CPC ....... *H01M 2/1686* (2013.01); *H01M 2/1646* (2013.01); *H01M 2/1653* (2013.01); *H01M 10/052* (2013.01); *H01M 2/1613* (2013.01); *H01M 10/0587* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | | |
|---|---|---|---|---|
| 6,387,570 | B1 * | 5/2002 | Nakamura et al. | 429/300 |
| 2003/0005577 | A1 * | 1/2003 | Kitano et al. | 29/623.3 |
| 2006/0060236 | A1 * | 3/2006 | Kim | 136/203 |
| 2008/0057400 | A1 * | 3/2008 | Nanno et al. | 429/254 |
| 2009/0111026 | A1 * | 4/2009 | Kim et al. | 429/252 |
| 2010/0203396 | A1 * | 8/2010 | Murata | H01M 2/1653 429/247 |

FOREIGN PATENT DOCUMENTS

| | | |
|---|---|---|
| JP | 2005-043307 | 2/2005 |
| JP | 2005-343937 | 12/2005 |
| JP | 2007-277580 | 10/2007 |
| JP | 2007-335167 | 12/2007 |
| JP | 2010-001110 | 1/2010 |
| JP | 2010-287472 | 12/2010 |
| JP | 2011-072067 | 4/2011 |

OTHER PUBLICATIONS

Machine translation of JP 2010-287472 (Year: 2010).*
Korean Office Action dated Aug. 30, 2018 in corresponding Korean Application No. 10-2012-0038521.

* cited by examiner

*Primary Examiner* — Wojciech Haske
(74) *Attorney, Agent, or Firm* — K&L Gates LLP

(57) ABSTRACT

A separator has: a substrate including a porous film; and a surface layer which is provided on at least one surface of the substrate, which includes a vinylidene fluoride-tetrafluoroethylene-hexafluoropropylene copolymer, and which has a plurality of minute pores.

13 Claims, 11 Drawing Sheets

SEPARATOR AND NONAQUEOUS ELECTROLYTE BATTERY, AND BATTERY PACK, ELECTRONIC APPARATUS, ELECTRIC VEHICLE, ELECTRIC POWER STORAGE DEVICE, AND ELECTRIC POWER SYSTEM

CROSS REFERENCES TO RELATED APPLICATIONS

The present application claims priority to Japanese Priority Patent Application JP 2011-095487 filed in the Japan Patent Office on Apr. 21, 2011, the entire content of which is hereby incorporated by reference.

BACKGROUND

The present disclosure relates to a separator including a substrate and a surface layer which compensates the strength thereof and improves a tear strength as a whole and a nonaqueous electrolyte battery using the separator. In addition, the present disclosure also relates to a battery pack, an electronic apparatus, an electric vehicle, an electric power storage device, and an electric power system, each of which uses the nonaqueous electrolyte battery described above.

In recent years, along with the popularization of portable information electronic apparatuses, such as a mobile phone, a video camera, and a notebook personal computer, improvement in performance, reduction is size, and reduction in weight of these apparatuses have been pursued. Although disposable primary batteries and rechargeable secondary batteries have been used as power sources of these apparatuses, in consideration of good comprehensive balance among high performance, compact size, light weight, economical efficiency, and the like, the demand of secondary batteries, in particular, a lithium ion secondary battery, has been increasing. In addition, in the apparatuses described above, further improvement in performance, reduction in size, and the like have been continuously performed, and also as for the lithium ion secondary battery, an increase in energy density has been demanded.

Since the energy density of the lithium ion secondary battery is increased concomitant with an increase in capacity thereof, improvement in reliability in the case in which large energy is released at the time of battery overheating or internal short circuit has also been increasingly demanded. Accordingly, a lithium ion secondary battery which can simultaneously satisfy high reliability in the cases as described above and an increase in capacity has been strongly desired.

A common lithium ion secondary battery includes a positive electrode containing a lithium composite oxide, a negative electrode containing a material capable of occluding and releasing lithium ions, at least one separator provided between the positive electrode and the negative electrode, and a nonaqueous electrolyte. In addition, the positive electrode and the negative electrode are laminated with the separator provided therebetween, or after being laminated with the separators provided therebetween, the positive electrode and the negative electrode are wound to form a columnar wound electrode. The separator functions to electrically isolate between the positive electrode and the negative electrodes and to retain a nonaqueous electrolyte. As the separator for the lithium ion secondary battery as described above, a porous film formed from a resin material, such as a polyolefin resin, has been commonly used.

In the past, in order to simultaneously obtain heat resistance and high strength, the separators have been frequently formed by a so-called wet method. The wet method is a method for forming a porous film by the steps of mixing a resin material forming a separator with a plasticizer or the like, forming a thin film, for example, by extrusion using a melt extrusion method, and extracting the plasticizer from the film to form pores at places at which the plasticizer is present. Since the pores are formed isotropically in the separator formed by the wet method, the tear strength is also isotropic. In addition, in a battery using the separator formed by the wet method, effects of performing a uniform electrochemical reaction, suppressing precipitation of lithium dendrites, and the like can also be obtained.

However, for the formation of the separator by the wet method, blending and extraction of the plasticizer are necessary, and in order to form a porous film having fine and uniform pore diameters, an operation process is not only complicated but also, for example, a treatment of an extraction liquid is inevitably performed. In addition, because of the complicated manufacturing process, its cost becomes very high.

Accordingly, a technique has been proposed in which a porous film formed using a so-called dry method is used as the separator. The dry method is a method for forming a porous resin film by forming a crystallized polyolefin resin into a thin film, for example, by a melt extrusion method, then performing an annealing (heating) treatment on the film, and drawing the film in one direction (uniaxial drawing). The dry method includes no extraction step (that is, no solvent treatment) of extracting a plasticizer or the like which is performed in the wet method. Therefore, in the dry method, a porous film can be formed by a substantially simple process as compared to that of the wet method. Accordingly, a separator formed by the dry method is generally inexpensive as compared to that formed by the wet method. On the other hand, a porous film formed by uniaxial drawing has a problem in that the tear strength in a drawing direction (Machine Direction, hereinafter referred to as "MD direction") is high and that in a direction perpendicular to the drawing direction (Transverse Direction, hereinafter referred to as "TD direction") is low. For this reason, the tear strength has anisotropy, and when a tensile load is applied in a drawing direction, the film is liable to be torn.

In addition, a separator having an inferior tear strength is easily torn when a foreign material is present in a separator formation process, and as a result, the yield is decreased. In addition, since the separator as described above is liable to be torn by a foreign material mixed in a battery, a dropping impact, or the like, the battery has a problem in safety.

Accordingly, Japanese Unexamined Patent Application Publication No. 2005-343937 has proposed a separator which contains three components, that is, a high-density polyethylene resin, a polypropylene resin, and a filler, and which has pores formed starting from the filler by drawing in one direction. Japanese Unexamined Patent Application Publication No. 2005-343937 has intended to improve tearing resistance of the separator itself by mixing a high-density polyethylene resin and a polypropylene resin.

In addition, Japanese Unexamined Patent Application Publication No. 2010-111096 has disclosed that a laminated porous film which has a layer containing a polypropylene resin as a primary component and a layer containing a polyethylene resin and which has a β activity is used as a separator. In Japanese Unexamined Patent Application Publication No. 2010-111096, since the layer containing a high-melting-point and a high-strength polypropylene resin as the primary component and a layer containing a soft and a low-melting point polyethylene resin are laminated to each other, a separator capable of performing shutdown at a predetermined temperature can be obtained while the strength thereof is maintained. In addition, in Japanese Unexamined Patent Application Publication No. 2010-111096, in order to obtain the balance of mechanical properties, the ratio in tear strength in the TD direction to the MD direction is set in a predetermined range.

Furthermore, Japanese Unexamined Patent Application Publication No. 2007-277580 has proposed as a separator having a high tear strength, a separator including a substrate formed of at least one of fiber and pulp and a porous layer which contains a para-aramide polymer covering the substrate and filling pores in the substrate.

SUMMARY

According to the method disclosed in Japanese Unexamined Patent Application Publication No. 2005-343937, by improvement in properties of the resin materials forming the separator, its own tearing resistance is improved; however, since the separator is formed by a dry method, it may be considered that significant improvement in properties is not obtained.

In addition, also in Japanese Unexamined Patent Application Publication No. 2010-111096, since the porous film is formed by drawing, difference in properties is generated depending on the direction. In addition, as can be seen from the example of Japanese Unexamined Patent Application Publication No. 2010-111096, although the ratio in tear strength in the TD direction to the MD direction is set in a predetermined range, the absolute value of the tear strength in one direction is remarkably decreased.

Furthermore, in the example of Japanese Unexamined Patent Application Publication No. 2007-277580, since a nonwoven fabric substrate is used, a sufficiently higher tear strength than that of a common porous resin film is obtained. Accordingly, when comparative example 1 in which a porous layer contains a para-aramide polymer covering the substrate is investigated, from description in which "tear start resistance is 1.4 kg/mm, a load is so low that tear strength propagation resistance is not able to be read, and handling properties are inferior", it is believed that a porous layer containing a para-aramide polymer has a remarkably low tearing resistance. In addition, for example, when the substrate is a common porous resin film, it may be considered that a separator having a low tear strength is formed.

Accordingly, in consideration of the problems of the related techniques as described above, it is desirable to provide a separator which has a high tear strength and which is not likely to be torn and a nonaqueous electrolyte battery using the separator described above, and a battery pack, an electronic apparatus, an electric vehicle, an electric power storage device, and an electric power system, each of which uses the nonaqueous electrolyte battery described above.

In order to solve the above problems, a separator according to an embodiment of the present disclosure includes: a substrate including a porous film; and a surface layer which is provided on at least one surface of the substrate, which includes a vinylidene fluoride-tetrafluoroethylene hexafluoropropylene copolymer, and which has many minute pores.

In addition, a nonaqueous electrolyte battery according to an embodiment of the present disclosure includes: a positive electrode; a negative electrode; a nonaqueous electrolyte; and at least one separator. In this nonaqueous electrolyte battery, the separator has a substrate including a porous film, and a surface layer which is provided on at least one surface of the substrate, which includes a vinylidene fluoride-tetrafluoroethylene-hexafluoropropylene copolymer, and which has many minute pores.

Furthermore, a battery pack, an electronic apparatus, an electric vehicle, an electric power storage device, and an electric power system according to an embodiment of the present disclosure each include the above nonaqueous electrolyte battery.

In the separator according to an embodiment of the present disclosure, the surface layer is formed using a vinylidene fluoride-tetrafluoroethylene-hexafluoropropylene copolymer. This copolymer has a high flexibility and excellent alkali resistance and oxidation resistance as compared to those of a vinylidene fluoride homopolymer. Accordingly, even if the substrate of the separator has an inferior strength as a porous film used for the separator, since the surface layer is formed on the surface of the substrate formed of the porous film by using the above copolymer, the surface layer can compensate lack of the strength of the substrate. In addition, even when the substrate is fractured, since the surface layer is elongated without being torn, the separator is unlikely to be fractured as a whole.

According to the present disclosure, the tear strength of the separator can be improved, and hence, the separator can be formed so as not to be easily torn.

Additional features and advantages are described herein, and will be apparent from the following Detailed Description and the figures.

DETAILED DESCRIPTION

Hereinafter, the best modes (hereinafter, referred to as "embodiments") for carrying out the present disclosure will be described. Incidentally, description will be made in the following order.
1. First Embodiment (example of a separator according to an embodiment of the present disclosure)
2. Second Embodiment (example of a cylindrical nonaqueous electrolyte battery using the separator according to the embodiment of the present disclosure)
3. Third Embodiment (example of a laminate film type nonaqueous electrolyte battery using the separator according to the embodiment of the present disclosure)
4. Fourth Embodiment (example of a battery pack using a nonaqueous electrolyte battery)
5. Fifth Embodiment (examples including an electric power storage system using a nonaqueous electrolyte battery)

1. First Embodiment

Figure 1:
FIG. 1 is a cross-sectional view showing the structure of a separator according to a first embodiment of the present disclosure.

A separator according to a first embodiment includes a substrate and a surface layer formed on at least one surface thereof. Besides application for battery separator, this separator may also be used for a general resin film application which may ask for tearing resistance. Hereinafter, the separator according to the first embodiment of the present disclosure will be described in detail.
(1-1) Structure of Separator As shown in FIG. 1, a separator 1 according to the first embodiment includes a substrate 2 formed of a porous film and a surface layer 3 which is formed on one surface of the substrate 2 and which is excellent in improvement in tear strength of the whole separator 1. When used for battery application, the separator 1 isolates a positive electrode from a negative electrode in a battery to prevent short circuit of current caused by contact between the two electrodes and is impregnated with a nonaqueous electrolyte. Although not shown in the figure, in the separator 1, the surface layers 3 may be formed on the two surfaces of the substrate 2. That is, the separator 1 includes the substrate 2 and the surface layer 3 formed on at least one surface thereof.

[Substrate]

The substrate 2 is a porous film formed from an insulating thin film having a high ion permeability and a predetermined mechanical strength. In addition, the substrate 2 according to the first embodiment of the present disclosure is formed as a porous film by performing uniaxial drawing of a resin film using a so-called dry method.

As a resin material forming the substrate 2 as described above, for example, a polyolefin resin, such as a polypropylene or a polyethylene, an acrylic resin, a styrene resin, a polyester resin, or a nylon resin is preferably used. In particular, since polyolefin resins including a polyethylene, such as a low-density polyethylene, a high-density polyethylene, and a linear polyethylene; a low-molecular-weight wax component thereof; and a polypropylene each have an appropriate melting temperature and are easily commercially available, the resins mentioned above are preferably used. In addition, a laminate film including at least two types of porous films formed from the above resins or a porous film formed by melt kneading of at least two types of the above resin materials may also be used. A substrate including a porous film formed from a polyolefin resin is excellent in isolation between the positive electrode and the negative electrode, and internal short circuit can be further suppressed.

The thickness of the substrate 2 may be arbitrarily set as long as being equal to or larger than a thickness at which a necessary strength can be maintained. The thickness of the substrate 2 is preferably set so as to obtain an ion permeability for preferably performing a battery reaction through the separator 1 and so as to increase a volumetric efficiency of active material layers which contribute to a battery reaction in the battery as well as to isolate between the positive electrode and the negative electrode and to prevent short circuit and the like. In particular, the thickness of the substrate 2 is preferably in a range of 7 to 20 μm. In addition, in order to obtain the above ion permeability, the porosity of the substrate 2 is preferably in a range of 35% to 50%.

[Surface Layer]

Figure 2:
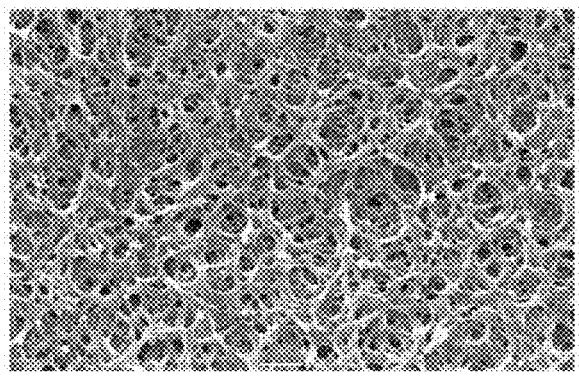
FIG. 2 is a secondary electron image by a scanning electron microscope (SEM) of the structure of a surface layer of the separator according to the first embodiment of the present disclosure.

The surface layer 3 is a layer formed on at least one surface of the substrate 2 and has a function to compensate tearing resistance of the substrate 2. The surface layer 3 has an ion permeation function, a nonaqueous electrolyte retention function, and the like as the separator 1. Accordingly, many minute pores are formed in the whole surface layer 3, and a three-dimensional network structure may be formed. In particular, as shown in FIG. 2, the surface layer 3 are preferably formed so that the above copolymer is fibrillated, and fibrils thereof are continuously connected to each other to form a three-dimensional network structure. In addition, FIG. 2 is a secondary electron image of the surface layer 3 by a scanning electron microscope (SEM).

According to the present disclosure, as a resin material forming the surface layer 3, a vinylidene fluoride (VdF)-tetrafluoroethylene (TFE)-hexafluoropropylene (HFP) copolymer is used. Since this copolymer is formed from a monomer unit derived from vinylidene-fluoride (VdF) having a high mechanical strength and excellent in workability and thermal stability; a monomer unit derived from tetrafluoroethylene (TFE) having a high chemical stability, such as alkali resistance and oxidation resistance; and a monomer unit derived from hexafluoropropylene (HFP) having a high flexibility, the surface layer 3 can be formed so as to have a high stability in the battery, have excellent elongation, and be not likely to be torn.

In addition, since the above copolymer is used, the surface layer 3 can be formed with a high surface density, and the tear strength can be further increased. The reason for this is that since the monomer unit derived from tetrafluoroethylene (TFE) is included in the copolymer, the resin is likely to be fibrillated when the surface layer 3 is formed, and as a result, a porous layer can be formed with a high resin concentration.

Furthermore, since the above copolymer has a low elastic modulus, cushioning properties of the separator 1 can be improved. In addition, since wettability between the substrate 2 and a resin solution in which this copolymer is dissolved in a dispersion solvent is increased, the formability of the surface layer 3 is improved. In addition, since many fluorine-containing groups are contained, the friction is decreased, and the formability of the surface layer 3 is improved.

In this copolymer, the contents of the monomer units forming the copolymer are preferably within the respective ranges shown below. In this copolymer, the content of the monomer unit derived from vinylidene fluoride (VdF) is preferably in a range of 45 to 85 percent by mole, the content of the monomer unit derived from tetrafluoroethylene (TFE) is preferably in a range of 10 to 40 percent by mole, and the content of the monomer unit derived from hexafluoropropylene (HFP) is preferably in a range of 5 to 15 percent by mole.

When the content of the monomer unit derived from tetrafluoroethylene (TFE) is lower than the above range, a sufficient chemical stability may not be obtained. In addition, when the content of the monomer unit derived from tetrafluoroethylene (TFE) is higher than the above range, for example, the flexibility of the surface layer 3 and the workability thereof when the surface layer 3 is formed may become insufficient. In addition, when the content of the monomer unit derived from hexafluoropropylene (HFP) is lower than the above range, a sufficient flexibility may not be obtained. In addition, when the content of the monomer unit derived from hexafluoropropylene (HFP) is higher than the above range, for example, swelling caused by the nonaqueous electrolyte may disadvantageously occur.

In addition, for example, in order to improve heat resistance, the surface layer 3 may be formed by mixing a heat resistant resin with the above copolymer or laminating a resin layer formed from a heat resistant resin on a resin layer formed from the above copolymer. In the case in which another heat resistant resin or the like is mixed with the copolymer according to the embodiment of the present disclosure, the tear strength of the surface layer 3 is decreased as the mixed amount of the copolymer is decreased. Hence, when a heat resistant resin or the like is mixed, the mixing amount thereof is appropriately set and is preferably decreased as small as possible.

As the heat resistant resin, for example, polyolefin resins, such as a polyethylene and a polypropylene; fluorine-containing resins, such as a poly(vinylidene fluoride) and a polytetrafluoroethylene; a fluorine-containing rubber, such as a vinylidene fluoride-tetrafluoroethylene copolymer, and an ethylene-tetrafluoroethylene copolymer; rubbers, such as a styrene-butadiene copolymer and its hydride, an acrylonitrile-butadiene copolymer and its hydride, an acrylonitrile-butadiene-styrene copolymer and its hydride, a methacrylic acid ester-acrylic acid ester copolymer, a styrene-acrylic acid ester copolymer, an acrylonitrile-acrylic acid ester copolymer, an ethylene propylene rubber, a poly(vinyl alcohol), and a poly(vinyl acetate); cellulose derivatives, such as an ethyl cellulose, a methyl cellulose, a hydroxyethyl cellulose, and a carboxymethyl cellulose; and resins, such as a poly(phenylene ether), a polysulfone, a poly(ether sulfone), a poly(phenylene sulfide), a poly(ether imide), a poly(amide imide), a polyamide, and a polyester, each having a melting point and/or a glass transition temperature of 180° C. or more.

The thickness of the surface layer 3 is preferably 1.0 μm or more. When the thickness is less than 1.0 μm, a sufficient tear strength may not be obtained, and the effect of forming the surface layer 3 is decreased. In addition, although the surface layer 3 has a higher tear strength as the thickness thereof is increased, the volumetric efficiency of the battery is decreased. Accordingly, the thickness of the surface layer 3 is appropriately selected in accordance with the necessity.

In addition, the surface layer 3 preferably has a higher porosity than that of the substrate 2 so as not to degrade the ion permeation function, the nonaqueous electrolyte retention function, and the like of the substrate 2. Furthermore, in order to obtain a tear strength necessary as the surface layer 3, the porosity thereof is preferably 75% or less and more preferably 70% or less.

In addition, as the thickness of the surface layer 3 is increased, even if the porosity is high, a tear strength which may sufficiently compensate the lack of strength of the substrate 2 can be obtained. For this reason, when the thickness of the surface layer 3 can be set sufficiently large, the porosity is not restricted to the above range.

(1-2) Another Structural Example of Separator

The surface layer 3 of the above separator 1 may contain a ceramic in order to improve heat resistance, oxidation resistance, and the like.

[Ceramics]

As the ceramic, for example, a metal oxide, a metal nitride, and a metal carbide, each having electric insulating properties, may be mentioned. As the metal oxide, for example, alumina ($Al_2O_3$), magnesia (MgO), titania ($TiO_2$), zirconia ($ZrO_2$), and silica ($SiO_2$) may be preferably used. As the metal nitride, for example, silicon nitride ($Si_3N_4$), aluminum nitride (AlN), boron nitride (BN), and titanium nitride (TiN) may be preferably used. As the metal carbide, for example, silicon carbide (SiC) and boron carbide ($B_4C$) may be preferably used. These ceramics may be used alone, or at least two thereof may be used in combination.

The ceramic is preferable since having heat resistance and being able to suppress contraction of the separator 1. In addition, since the ceramic has oxidation resistance, when being used for battery application, the ceramic has strong resistance against an oxidation atmosphere in the vicinity of the electrode, in particular, in the vicinity of the positive electrode at the time of charge. Accordingly, when being exposed to an oxidation atmosphere, the surface layer 3 is degraded, and the effect of improving a tear strength of the whole separator 1, which is obtained by compensating the tear strength of the substrate 2, is also decreased; however, when the ceramic is contained in the surface layer 3, the decrease of the above effect can be suppressed. Hence, when a surface layer 3 containing a ceramic is formed only one surface of the substrate 2, the surface layer 3 is preferably formed on a surface thereof facing the positive electrode.

The shape of the ceramic is not particularly limited, and ceramics having a spherical shape, a fibrous shape, a random shape, and the like may also be used.

In consideration of the influence on the strength of the separator 1 and the smoothness of a coating surface, the average particle diameter of the primary particles of the ceramic is preferably set to several micrometers or less. In particular, the average particle diameter of the primary particles is preferably 1.0 μm or less, more preferably 0.5 μm or less, and even more preferably 0.1 μm or less. The average particle diameter of the primary particles as described above can be measured by a method in which a photograph obtained by an electron microscope is analyzed by a particle diameter measuring instrument.

When the average particle diameter of the primary particles of the ceramic is more than 1.0 μm, in some cases, the separator 1 may become fragile, and the coating surface may also become coarse. In addition, when a resin solution containing a ceramic is applied on the substrate 2 to form the surface layer 3, if the primary particles of the ceramic are too large, areas on which the resin solution containing a ceramic is not applied may be generated in some cases.

In addition, in the present disclosure, a mass ratio of the ceramic in the surface layer 3 to the copolymer according to the embodiment of the present disclosure which forms the surface layer 3 is preferably in a range of 0:100 to 80:20 and more preferably in a range of 30:70 to 80:20. In addition, the range described above includes the case in which no ceramic is contained, and in consideration of the effect of improving a strength of the separator 1, no ceramic is preferably added. On the other hand, in order to further obtain heat resistance, the above range of the mass ratio is preferable, that is, in other words, the content of the ceramic in the surface layer 3 to the total mass of the ceramic and the copolymer according to the embodiment of the present disclosure in the surface layer 3 is preferably in a range of more than 0 to 80 percent by mass and more preferably in a range of 30 to 80 percent by mass. When the surface layer 3 contains a ceramic, ceramic-containing effects relating to heat resistance, oxidation resistance, and the like can be obtained in the surface layer 3. In addition, when the content of the ceramic to the total mass of the ceramic and the copolymer according to the embodiment of the present disclosure is 80 percent by mass or less, it is preferable since the surface layer 3 can be easily formed.

(1-3) Method for Manufacturing Separator

One example of a method for manufacturing the separator 1 according to the first embodiment will be described.

First, a vinylidene fluoride-tetrafluoroethylene-hexafluoropropylene copolymer is added to and is dissolved in a dispersion solvent, such as N-methyl-2-pyrrolidone, so that a resin solution is obtained. In this case, the concentration of the copolymer in the resin solution is preferably in a range of 4 to 10 percent by mass. This resin solution is formed as a slurry for surface-layer formation. In addition, as described above, since tetrafluoroethylene (TFE) is contained as a monomer forming the copolymer, the porous resin layer can be formed to have a high resin concentration. In particular, when a poly(vinylidene fluoride) is used as a resin material, and the resin concentration is set to approximately 8 percent by mass or more, in a method for performing phase separation by placing the resin material in a water bath, it is difficult to form a uniform and dense porous film. When the copolymer according to the embodiment of the present disclosure is used, even if the concentration thereof is 8 percent by mass or more, a uniform and a dense porous layer can be formed.

Subsequently, the slurry for surface-layer formation is applied to one or two surfaces of the substrate 2 formed of a polyolefin porous film or the like and is then dried. Furthermore, the substrate 2 coated with the slurry for surface-layer formation is placed in a water bath to perform phase separation.

Figure 3:
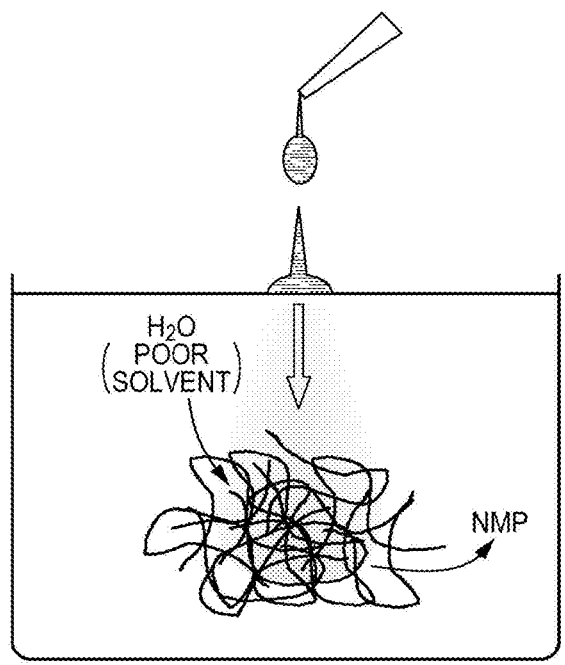
FIG. 3 is a schematic view showing a method for manufacturing the separator according to the first embodiment of the present disclosure.

FIG. 3 is a schematic view showing the phase separation. As shown in FIG. 3, when a copolymer solution which contains the copolymer according to the embodiment of the present disclosure is brought into contact with water or the like which is a poor solvent to the copolymer and a good solvent to the dispersion solvent dissolving the copolymer, and drying is finally performed by a hot wind, the separator 1 in which the surface layer 3 is formed on at least one surface of the substrate 2 can be obtained.

By using the method as described above, the surface layer 3 is formed by a rapid poor solvent-induced phase separation phenomenon, and as a result, the surface layer 3 has the structure in which skeletons of the copolymer are connected to each other in a three-dimensional network state. That is, when the resin solution dissolving the copolymer is brought into contact with a solvent, such as water, which is a poor solvent to the copolymer and a good solvent to the solvent dissolving the copolymer, solvent exchange occurs. Accordingly, a rapid (high-velocity) phase separation occurs accompanied by the spinodal decomposition, and as a result, the copolymer has a unique three-dimensional network structure.

By using the rapid poor solvent-induced phase separation phenomenon accompanied by the spinodal decomposition, the surface layer 3 thus prepared forms a unique porous structure. Furthermore, according to this structure, excellent nonaqueous-electrolyte impregnating ability and ion conductivity can be realized.

Figure 4A:
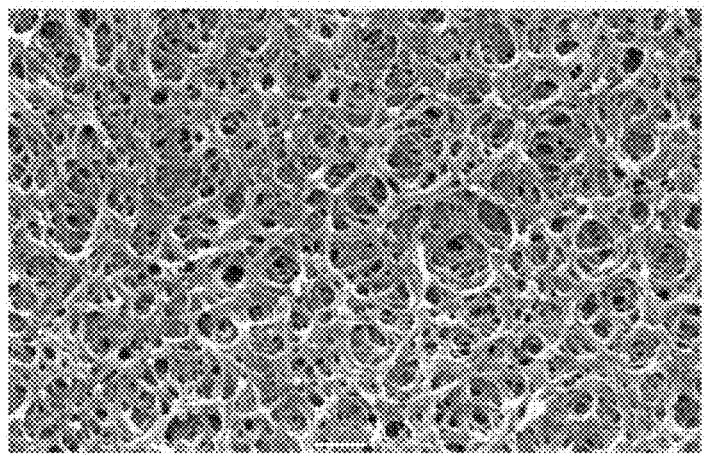
FIG. 4A is a secondary electron image by a scanning electron microscope (SEM) of the structure of the surface layer of the separator according to the first embodiment of the present disclosure which is formed at a resin concentration of 6 percent by mass.
Figure 4B:
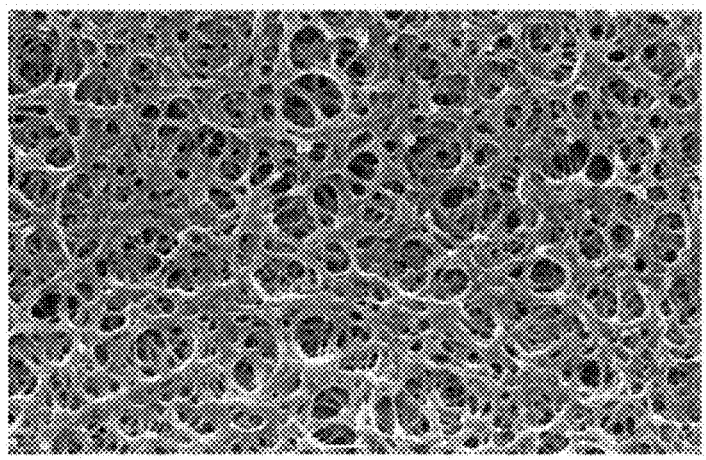
FIG. 4B is a secondary electron image by a scanning electron microscope (SEM) of the structure of the surface layer of the separator according to the first embodiment of the present disclosure which is formed at a resin concentration of 8 percent by mass.
Figure 4C:
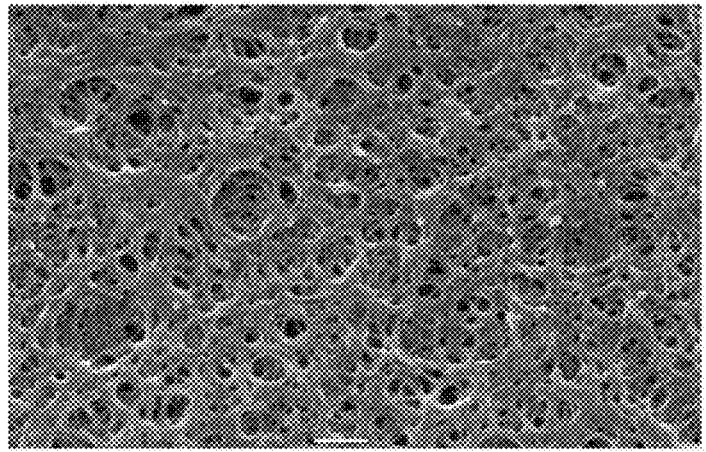
FIG. 4C is a secondary electron image by a scanning electron microscope (SEM) of the structure of the surface layer of the separator according to the first embodiment of the present disclosure which is formed at a resin concentration of 10 percent by mass.

FIGS. 4A to 4C are each a secondary electron image by a scanning electron microscope (SEM) of the surface layer 3 formed by changing the copolymer concentration of the resin solution. FIG. 4A shows the surface layer 3 formed at a resin concentration of 6 percent by mass, FIG. 4B shows the surface layer 3 formed at a resin concentration of 8 percent by mass, and FIG. 4C shows the surface layer 3 formed at a resin concentration of 10 percent by mass. As shown in FIG. 4C, even if the resin concentration is high, such as 10 percent by mass, the surface layer 3 can be formed to have a three-dimensional network structure.

As the dispersion solvent, any solvent capable of dissolving the copolymer according to the embodiment of the present disclosure may be used. As the dispersion solvent, besides N-methyl-2-pyrrolidone, for example, dimethylacetamide, dimethylformamide, dimethylsulfoxide, toluene, and acetonitrile may also be used. In consideration of the solubility and high dispersibility, N-methyl-2-pyrrolidone is preferably used.

(1-4) Another Method for Manufacturing Separator

When the surface layer 3 containing a ceramic is formed, the surface layer 3 may be formed by a method other than that using the above poor solvent-induced phase separation phenomenon.

In particular, a vinylidene fluoride-tetrafluoroethylene-hexafluoropropylene copolymer is added to and is dissolved in a dispersion solvent, such as N-methyl-2-pyrrolidone, so that a resin solution is obtained. In this case, since a ceramic is added later, the concentration of the copolymer in the resin solution is preferably set lower than the concentration of the copolymer described in the above (1-3). In particular, the concentration is preferably in a range of 2 to 8 percent by mass. In addition, the total content of the copolymer and the ceramic in the resin solution to which the ceramic is added is preferably in a range of 2 to 30 percent by mass. The concentration is appropriately adjusted so that the ceramic can be uniformly dispersed in a coating material and so that application can be performed.

Next, a predetermined amount of a fine ceramic powder is added to the resin solution containing the copolymer according to the embodiment of the present disclosure, and stirring is further performed using a grinding mill, so that a slurry for surface-layer formation in which the ceramic is uniformly dispersed is obtained.

Subsequently, the slurry for surface-layer formation is applied on one or two surfaces of the substrate 2 formed of a polyolefin porous film or the like, for example, by a doctor blade and is then dried by a hot wind, so that the dispersion solvent is removed. Accordingly, the separator 1 in which the surface layer 3 is formed on at least one surface of the substrate 2 can be obtained.

In the case in which the ceramic is added to the slurry for surface-layer formation when the surface layer 3 is formed, minute pores resulting from the interaction between the ceramic and the copolymer are formed therebetween. Hence, without using the method which uses the poor solvent-induced phase separation phenomenon, minute pores can be formed in the surface layer 3.

2. Second Embodiment

Figure 5:
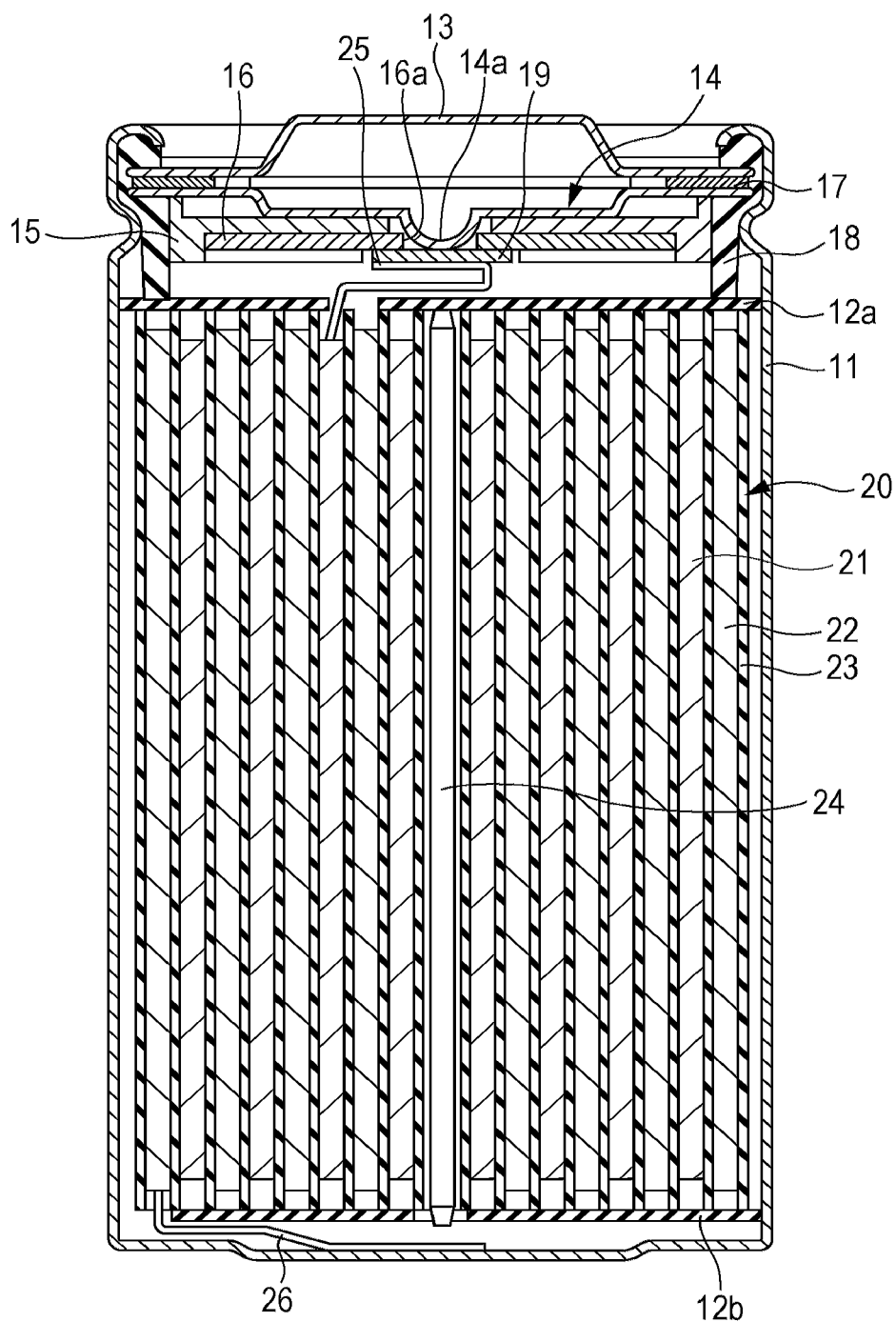
FIG. 5 is a cross-sectional view of the structure of a nonaqueous electrolyte battery according to a second embodiment of the present disclosure.

In a second embodiment, a cylindrical nonaqueous electrolyte battery using the separator according to the first embodiment will be described.
(2-1) Composition of Nonaqueous Electrolyte Battery
[Structure of Nonaqueous Electrolyte Battery]
FIG. 5 is a cross-sectional view showing one example of a nonaqueous electrolyte battery 10 according to the second embodiment. The nonaqueous electrolyte battery 10 is, for example, a nonaqueous electrolyte secondary battery capable of performing charge and discharge. This nonaqueous electrolyte battery 10 is a so-called cylindrical type and has, in an approximately hollow cylindrical battery can 11, a wound electrode body 20 in which a belt-shaped positive electrode 21 and a belt-shaped negative electrode 22 are wound with separators 23 provided therebetween together with a nonaqueous electrolyte liquid (hereinafter, appropriately referred to as "nonaqueous electrolyte" in some cases) not shown in the figure. In the wound electrode body 20, a tensile stress is likely to be applied to the separator in a winding direction thereof by expansion and contraction of active material layers. Accordingly, the separator according to the embodiment of the present disclosure is preferably applied to the nonaqueous electrolyte battery 10 having the wound electrode body 20.

The battery can 11 is formed, for example, of a nickel-plated iron, and one end portion of the battery can 11 is closed, and the other end portion thereof is opened. Inside the battery can 11, a pair of electric insulating plates 12a and 12b is provided in a direction perpendicular a circumferential surface so as to sandwich the wound electrode body 20.

As a material of the battery can 11, for example, iron (Fe), nickel (Ni), stainless steel (SUS), aluminum (Al), and titanium (Ti) may be mentioned. In order to prevent electrochemical corrosion by a nonaqueous electrolyte caused by charge and discharge of the nonaqueous electrolyte battery 10, for example, nickel plating may be performed on this battery can 11. A battery lid 13 functioning as a positive electrode lead plate, a safety valve mechanism, and a positive temperature coefficient element (PTC element) 17, the latter two of which are provided inside the battery lid 13, are fixed to the open end portion of the battery can 11 by caulking with a gasket 18 used for insulation sealing provided therebetween.

The battery lid 13 is formed, for example, of a material similar to that of the battery can 11 and has an opening portion to discharge a gas generated inside the battery. The safety valve mechanism is formed of a safety valve 14, a disc holder 15, and a blocking disc 16, which are sequentially laminated to each other. A projecting portion 14a of the safety valve 14 is connected to a positive electrode lead 25 extended from the wound electrode body 20 through a sub-disc 19 arranged so as to cover an opening portion 16a provided in the central area of the blocking disc 16. Since the safety valve 14 and the positive electrode lead 25 are connected to each other with the sub-disc 19 provided therebetween, the positive electrode lead 25 is prevented from being drawn through the opening portion 16a when the safety valve 14 is reversed. In addition, the safety valve mechanism is electrically connected to the battery lid 13 with the PTC element 17 provided therebetween.

When the internal pressure of the nonaqueous electrolyte battery 10 is increased to a predetermined value or more, for example, by short circuit inside the battery or heating outside the battery, the safety valve 14 is reversed, so that the projecting portion 14a and the battery lid 13 are electrically disconnected from the wound electrode body 20. That is, when the safety valve 14 is reversed, the positive electrode lead 25 is held by the blocking disc 16, and the safety valve 14 is disconnected from the positive electrode lead 25. The disc holder 15 is formed of an insulating material, and when the safety valve 14 is reversed, the safety valve 14 and the blocking disc 16 are insulated from each other.

In addition, when a gas is further generated inside the battery, and the inside pressure of the battery is further increased, the safety valve 14 is partially destroyed so as to enable the gas to escape to a battery lid 13 side.

In addition, a plurality of gas discharge holes (not shown) is provided, for example, along the periphery of the opening portion 16a of the blocking disc 16, and when a gas is generated from the wound electrode body 20, the structure is configured so as to effectively discharge a gas to the battery lid 13 side.

When the temperature is increased, the PTC element 17 increases its resistance and electrically disconnects between the battery lid 13 and the wound electrode body 20 to block current flow, so that abnormal heat generation caused by an excessive current is prevented. The gasket 18 is formed, for example, of an insulating material, and asphalt is applied to the surface thereof.

The wound electrode body 20 accommodated in the battery can 11 is wound around a center pin 24. The wound electrode body 20 is formed such that the positive electrode 21 and the negative electrode 22 are sequentially laminated with the separators 23 provided therebetween and are then wound in a longitudinal direction. The positive electrode lead 25 is connected to the positive electrode 21, and a negative electrode lead 26 is connected to the negative electrode 22. As described above, the positive electrode lead 25 is welded to the safety valve so as to be electrically connected to the battery lid 13, and the negative electrode lead 26 is welded to the battery can 11 so as to be electrically connected thereto.

Figure 6:
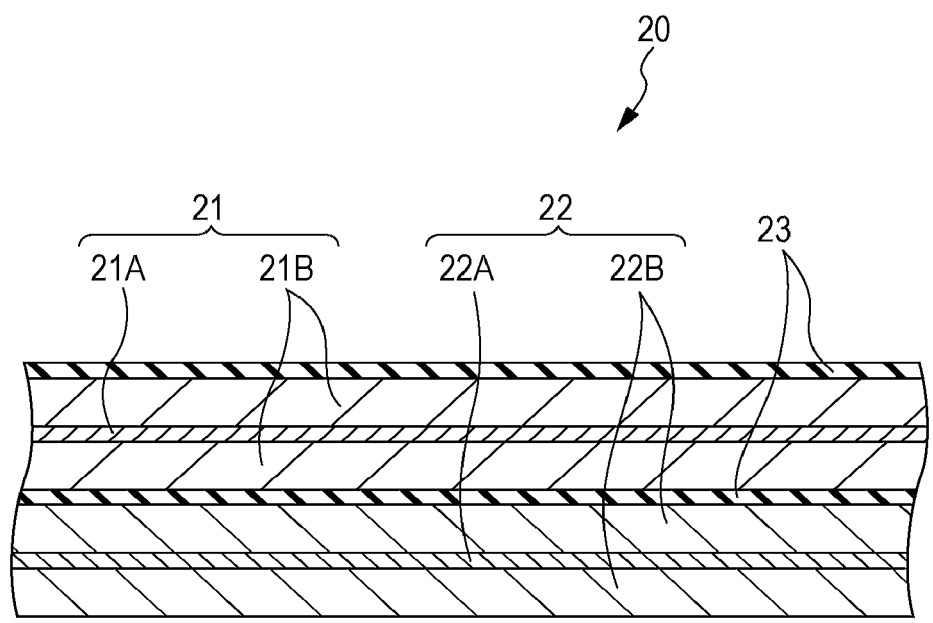
FIG. 6 is a partially enlarged cross-sectional view of a wound electrode body of the nonaqueous electrolyte battery shown in FIG. 5.

FIG. 6 is a partially enlarged view of the wound electrode body 20 shown in FIG. 5. Hereinafter, the positive electrode 21, the negative electrode 22, and the separator 23 will be described in detail.
[Positive Electrode]
The positive electrode 21 is formed in such a way that positive electrode active material layers 21B each containing a positive electrode active material are provided on two surfaces of a positive electrode collector 21A. As the positive electrode collector 21A, for example, a metal foil, such as an aluminum (Al) foil, a nickel (Ni) foil, or a stainless steel (SUS) foil may be used.

The positive electrode active material layer 21B is formed, for example, from the positive electrode active material, a conducting agent, and a binder. As the positive electrode active material, at least one type of positive electrode material capable of occluding and releasing lithium may be used, and if necessary, other materials, such as a binder and a conducting agent, may also be contained.

As the positive electrode material capable of occluding and releasing lithium, for example, a lithium-containing compound is preferable. The reason for this is that a high energy density can be obtained. As this lithium-containing compound, for example, a composite oxide containing lithium and a transition metal element or a phosphoric acid compound containing lithium and a transition metal element may be mentioned. In particular, as the transition metal element, at least one type selected from the group consisting of cobalt (Co), nickel (Ni), manganese (Mn), and iron (Fe) is preferably contained. The reason for this is that a higher voltage can be obtained.

As the positive electrode material, for example, a lithium-containing compound, such as $Li_xM1O_2$ or $Li_yM2PO_4$, may be used. In the formula, M1 and M2 represent at least one type of transition metal element. The values of x and y changes in accordance with a charge/discharge state of the battery and generally satisfy $0.05 \leq x \leq 1.10$ and $0.05 \leq y \leq 1.10$, respectively. As the composite oxide containing lithium and a transition metal element, for example, there may be mentioned a lithium cobalt composite oxide ($Li_xCoO_2$), a lithium nickel complex oxide ($Li_yNiO_2$), a lithium nickel cobalt composite oxide ($Li_xNi_{1-z}Co_zO_2$ ($0<z<1$)), a lithium nickel cobalt manganese composite oxide ($LNi_{(1-v-w)}Co_v Mn_wO_2$ ($0<v+w<1$, $v>0$, $w>0$)), or a lithium manganese composite oxide ($LiM_2O_4$) or a lithium manganese nickel composite oxide ($LiMn_{2-t}Ni_tO_4$ ($0<t<2$)), each of which has a spinel structure. Among those mentioned above, the composite oxide containing cobalt is preferable. The reason for this is that excellent cycle properties can be obtained as well as a high capacity. In addition, as the phosphoric acid compound containing lithium and a transition metal element, for example, a lithium iron phosphoric acid compound ($LiFePO_4$) or a lithium iron manganese phosphoric acid compound ($LiFe_{1-u}Mn_uPO_4$ ($0<u<1$)) may be mentioned.

As the lithium composite oxide described above, in particular, cobalt acid lithium ($LiCoO_2$), nickel acid lithium ($LiNiO_2$), manganic acid lithium ($LiMn_2O_4$), and the like may be mentioned. In addition, a solid solution in which a transition metal element is partially substituted with another element may also be used. For example, nickel cobalt composite lithium oxides ($LiNi_{0.5}Co_{0.5}O_2$, $LiNi_{0.8}Co_{0.2}O_2$, and the like) may be mentioned by way of example. These lithium composite oxides can generate a high voltage and are excellent in energy density.

Furthermore, in order to obtain higher electrode packing properties and cycle properties, composite particles may be formed by covering surfaces of particles formed from at least one of the above lithium-containing compounds with fine particles formed from at least one of other lithium-containing compounds.

In addition, as the positive electrode material capable of occluding and releasing lithium, for example, there may be mentioned oxides, such as vanadium oxide ($V_2O_5$), titanium dioxide ($TiO_2$), and manganese dioxide ($MnO_2$); disulfides, such as iron disulfide ($FeS_2$), titanium disulfide ($TiS_2$), and molybdenum disulfide ($MoS_2$); chalcogen compounds, such as niobium diselenide ($NbSe_2$), containing no lithium (in particular, a laminar compound and a spinel type compound); lithium-containing compounds; and conductive polymers, such as sulfur, a polyaniline, a polythiophene, a polyacetylene, and a polypyrrole. Of course, as the positive electrode material capable of occluding and releasing lithium, materials other than those mentioned above may also be used. In addition, the positive electrode materials mentioned above may be used alone, or at least two thereof may be used in arbitrary combination.

As the conducting agent, for example, carbon materials, such as carbon black or graphite, may be mentioned. As the binder, for example, there may be mentioned at least one type selected from resin materials, such as a poly(vinylidene fluoride) (PVdF), a polytetrafluoroethylene (PTFE), a polyacrylonitrile (PAN), a styrene butadiene rubber (SBR), and a carboxymethyl cellulose (CMC), and copolymers and the like primarily formed from the resin materials mentioned above.

The positive electrode 21 has the positive electrode lead 25 connected to one end portion of the positive electrode collector 21A by spot welding or ultrasonic welding. Although this positive electrode lead 25 is preferably a metal foil having a network shape, a material other than the metal may also be used without any problems if having an electrochemical and a chemical stability and electrical conduction properties. As a material of the positive electrode lead 25, for example, aluminum (Al) and nickel (Ni) may be mentioned.

[Negative Electrode]

The negative electrode 22 has the structure, for example, in which negative electrode active material layers 22b are provided on two surfaces of a negative electrode collector 22A having a pair of surfaces facing each other. Although not shown in the figure, the negative electrode active material layer 22B may only be provided on one surface of the negative electrode collector 22A. The negative electrode collector 22A is formed, for example, of a metal foil, such as a copper foil.

The negative electrode active material layer 22B includes at least one type of negative electrode material capable of occluding and releasing lithium as a negative electrode active material and, if necessary, may also include other materials, such as a binder and a conducting agent, as in the case of the positive electrode active material layer 21B.

In addition, since this nonaqueous electrolyte battery 10 is configured so that the electrochemical equivalent of the negative electrode material capable of occluding and releasing lithium is higher than the electrochemical equivalent of the positive electrode 21, a lithium metal is not theoretically precipitated on the negative electrode 22 during charge operation.

In addition, this nonaqueous electrolyte battery 10 is designed so that an open-circuit voltage (that is, battery voltage) in a complete charge state is, for example, in a range of 4.20 to 6.00 V. In addition, for example, the open-circuit voltage in a full charge state is preferably set in a range of 4.25 to 6.00 V. When the open-circuit voltage in a full charge state is set to 4.25 V or more, since a release amount of lithium per unit mass is increased as compared to a battery at a voltage of 4.20 V even if the same positive electrode active material is used, in accordance therewith, the amount of the positive electrode active material and that of the negative electrode active material are adjusted. Accordingly, the nonaqueous electrolyte battery 10 is configured so as to obtain a high energy density.

As the negative electrode material capable of occluding and releasing lithium, for example, there may be mentioned carbon materials, such as non-graphitizable carbon, graphitizable carbon, graphite, pyrolytic carbon, coke, glassy carbon, baked organic polymer compounds, carbon fibers, or activated carbon. Among those mentioned above, as the coke, for example, pitch coke, needle coke, or petroleum coke may be mentioned. The baked organic polymer compounds are polymeric materials, such as a phenol resin and a furan resin, carbonized by baking at a suitable temperature, and some of them are classified into non-graphitizable carbon or graphitizable carbon. Since these carbon materials have a very small change in crystal structure generated during charge and discharge, good cycle properties can be preferably obtained as well as a high charge/discharge capacity. In particular, graphite is preferable since the electrochemical equivalent is high and a high energy density can be obtained. In addition, non-graphitizable carbon is preferable since excellent cycle properties can be obtained. Furthermore, a material having a low charge/discharge potential, in particular, a material having a charge/discharge potential similar to that of a lithium metal, is preferable since an increase in energy density of the battery can be easily achieved.

As the negative electrode material capable of occluding and releasing lithium, a material which is capable of occluding and releasing lithium and which includes at least one of a metal element and a metalloid element may also be mentioned. The reason for this is that a high energy density can be obtained by using the material as described above. In particular, when being used together with a carbon material, the above material is more preferable since excellent cycle properties can be obtained as well as a high energy density. This negative electrode material may be a simple substance, an alloy, or a compound of a metal element or a metalloid element or may partially include at least one phase of these mentioned above. In addition, in the present disclosure, besides an alloy containing at least two types of metal elements, an alloy containing at least one type of metal element and at least one type of metalloid element may also be mentioned as the negative electrode material. In addition, a nonmetal element may also be contained. In the above texture, a solid solution, an eutectic (eutectic mixture), an intermetallic compound, or a compound including at least two thereof may also be contained in some cases.

As the metal element or the metalloid element forming this negative electrode material, for example, a metal element or a metalloid element, which can form an alloy with lithium, may be mentioned. In particular, for example, there may be mentioned magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), or platinum (Pt). Either a crystalline or an amorphous substance thereof may be used.

Among those mentioned above, as this negative electrode material, a material containing a metal element or a metalloid element of the group 4B in the short periodic table is preferable, a material containing at least one of silicon (Si) and tin (Sn) as a constituent element is more preferable, and a material containing at least silicon is particularly preferable. The reason for this is that silicon (Si) and tin (Sn) each have a high ability of occluding and releasing lithium, and a high energy density can be obtained. As a negative electrode material containing at least one of silicon and tin, for example, a material containing a simple substance, an alloy, or a compound of silicon; a material containing a simple substance, an alloy, or a compound of tin, and a material at least partially containing at least one type of phase of those mentioned above may also mentioned.

As the alloy of silicon, for example, there may be mentioned a material which contains at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as the second constituent element other than silicon. As the alloy of tin, for example, there may be mentioned a material which contains at least one selected from the group consisting of silicon (Si), nickel (Ni), copper (Cu), iron (Fe), cobalt (Co), manganese (Mn), zinc (Zn), indium (In), silver (Ag) titanium (Ti), germanium (Ge), bismuth (Bi), antimony (Sb), and chromium (Cr) as the second constituent element other than tin.

As the compound of tin (Sn) or the compound of silicon (Si), for example, a compound containing oxygen (O) or carbon (C) may be mentioned, and besides tin (Sn) or silicon (Si), the second constituent element mentioned above may also be contained.

Among those mentioned above, as this negative electrode material, a SnCoC-containing material is preferable in which cobalt (Co), tin (Sn), and carbon (C) are contained as constituent elements, the content of carbon is in a range of 9.9 to 29.7 percent by mass, and the ratio of cobalt (Co) to the total of tin (Sn) and cobalt (Co) is in a range of 30 to 70 percent by mass. The reason for this is that in the composition ranges as described above, excellent cycle properties can be obtained as well as a high energy density.

This SnCoC-containing material may further contain at least one another constituent element, if necessary. As the another constituent element, for example, silicon (Si), iron (Fe), nickel (Ni), chromium (Cr), indium (In), niobium (Nb), germanium (Ge), titanium (Ti), molybdenum (Mo), aluminum (Al), phosphorus (P), gallium (Ga), or bismuth (Bi) is preferable, and at least two thereof may also be contained. The reason for this is that the capacity or the cycle properties can be further improved.

This SnCoC-containing material has a phase containing tin (Sn), cobalt (Co), and carbon (C), and this phase preferably has a low-crystalline or an amorphous structure. In addition, in this SnCoC-containing material, at least part of the carbon (C), which is a constituent element, is preferably bonded to a metal element or a metalloid element, which is another constituent element. The reason for this is that although it is believed that degradation in cycle properties is caused by aggregation or crystallization of tin (Sn) or the like, when carbon (C) is bonded to another element, the aggregation or the crystallization can be suppressed.

As a method for measuring the bonding state of elements, for example, an X-ray photoelectron spectroscopy (XPS) may be mentioned. In XPS, when graphite is measured, the peak of the 1s orbit (C1s) of carbon is obtained at 284.5 eV by an apparatus in which energy calibration is performed so that the 4f orbit (Au4f) of a gold element is obtained at a peak of 84.0 eV. In addition, when a surface-contaminated carbon is measured, its peak is obtained at 284.8 eV. On the other hand, when the charge density of a carbon element is increased, for example, when carbon is bonded to a metal element or a metalloid element, the peak of C1s is obtained in a range lower than 284.5 eV. That is, when the peak of an associated wave of C1s obtained from the SnCoC-containing material is in a range lower than 284.5 eV, at least part of carbon contained in the SnCoC-containing material is bonded to a metal element or a metalloid element, which is another constituent element.

In addition, in XPS measurement, for example, the peak of C1s is used for calibration of the energy axis of a spectrum. In general, since a surface-contaminated carbon is present on the surface, the peak of C1s thereof is set at 284.8 ev, and this value is used as the energy standard. In the XPS measurement, since the waveform of the peak of C1s is obtained as a form including the peak of the surface-contaminated carbon and the peak of carbon in the SnCoC-containing material, by analysis using a commercially available software or the like, the peak of the surface-contaminated carbon and the peak of carbon in the SnCoC-containing material are separated from each other. In the analysis of the waveform, the position of the primary peak located at a minimum binding energy side is regarded as the energy standard (284.8 eV).

[Separator]

The separator 23 is the same as the separator 1 according to the first embodiment.

[Nonaqueous Electrolyte]

The nonaqueous electrolyte contains an electrolyte salt and a nonaqueous solvent dissolving this electrolyte salt.

The electrolyte salt contains at least one type of light metal compound, such as a lithium salt. As this lithium salt, for example, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate ($Li_2SiF_6$), lithium chloride (LiCl), or a lithium bromide (LiBr) may be mentioned. Among those mentioned above, at least one type selected from the group consisting of lithium hexafluorophosphate, lithium tetrafluoroborate, lithium perchlorate, and lithium hexafluoroarsenate is preferable, and lithium hexafluorophosphate is more preferable.

As the nonaqueous solvent, for example, there may be mentioned a lactone-based solvent, such as γ-butyrolactone, γ-valerolactone, δ-valerolactone, or ε-caprolactone; a carbonate-based solvent, such as ethylene carbonate, propylene carbonate, butylene carbonate, vinylene carbonate, dimethyl carbonate, ethyl methyl carbonate, or diethyl carbonate; an ether-based solvent, such as 1,2-dimethoxyethane, 1-ethoxy-2-methoxyethane, 1,2-diethoxyethane, tetrahydrofuran, or 2-methyltetrahydrofuran; a nitrile-based solvent, such as acetonitrile; a sulfolane-based solvent; a phosphoric acid-based solvent; a phosphoric ester solvent; or a pyrrolidone-based solvent. As the solvent, one of those mentioned above may be used alone, or at least two thereof may be used in combination.

In addition, as the nonaqueous solvent, a cyclic carbonate and a chain carbonate are preferably used in combination, and a compound in which hydrogen atoms of a cyclic carbonate or a chain carbonate are partially or fully substituted with fluorine atoms is more preferably contained. As this fluorinated compound, a fluoroethylene carbonate (such as 4-fluoro-1,3-dioxolane-2-one: FEC) and difluoroethylene carbonate (4,5-difluoro-1,3-dioxolane-2-one: DFEC) are preferably used. The reason for this is that even when a compound of silicon (Si), tin (Sn), germanium (Ge), or the like is used as the negative electrode active material of the negative electrode 22, charge/discharge cycle properties can be improved. In particular, as the nonaqueous solvent, difluoroethylene carbonate is preferably used. The reason for this is that an excellent effect of improving cycle properties can be obtained.

(2-2) Method for Manufacturing Nonaqueous Electrolyte Battery

[Method for Manufacturing Positive Electrode]

A positive electrode active material, a conducting agent, and a binder are mixed together to prepare a positive electrode mixture, and this positive electrode mixture is dispersed in a solvent, such as N-methyl-2-pyrrolidone, to form a positive electrode mixture slurry in the form of a paste. Next, after this positive electrode mixture slurry is applied to the positive electrode collector 21A, and the solvent is removed by drying, the positive electrode active material layers 21B are formed by compression molding using a roll press machine or the like, thereby forming the positive electrode 21.

[Method for Manufacturing Negative Electrode]

A negative electrode active material and a binder are mixed together to prepare a negative electrode mixture, and this negative electrode mixture is dispersed in a solvent, such as N-methyl-2-pyrrolidone, to form a negative electrode mixture slurry in the form of a paste. Next, after this negative electrode mixture slurry is applied to the negative electrode collector 22A, and the solvent is removed by drying, the negative electrode active material layers 22B are formed by compression molding using a roll press machine or the like, thereby forming the negative electrode 22.

[Preparation of Nonaqueous Electrolyte]

The nonaqueous electrolyte is prepared by dissolving an electrolyte salt in a nonaqueous solvent.

[Assembly of Nonaqueous Electrolyte Battery]

The positive electrode lead 25 is fitted to the positive electrode collector 21A by welding or the like, and the negative electrode lead 26 is also fitted to the negative electrode collector 22A by welding or the like. Then, the positive electrode 21 and the negative electrode 22 are wound with the separators 23 provided therebetween to form the wound electrode body 20. A front end of the positive electrode lead 25 is welded to the safety valve mechanism, and a front end of the negative electrode lead 26 is welded to the battery can 11. Subsequently, the electric insulating plates 12a and 12b are provided in a direction perpendicular to the circumference surface so as to sandwich the wound battery body 20, and the wound battery body 20 is then accommodated inside the battery can 11. After the wound electrode body 20 is accommodated in the battery can 11, the nonaqueous electrolyte is supplied inside the battery can 11 and is impregnated in the separators 23. Subsequently, the PTC element 17 and the safety valve mechanism including the battery lid 13, the safety valve 14, and the like are fixed to an open end of the battery can 11 by caulking with the gasket 18 provided therebetween. Accordingly, the nonaqueous electrolyte battery 10 according to the embodiment of the present disclosure shown in FIG. 5 is formed.

In this nonaqueous electrolyte battery 10, when charge is performed, for example, lithium ions are released from the positive electrode active material layer 21B and are occluded in the negative electrode active material layer 22B through the nonaqueous electrolyte impregnated in the separator 23. In addition, when discharge is performed, for example, lithium ions are released from the negative electrode active material layer 22B and are occluded in the positive electrode active material layer 21B through the nonaqueous electrolyte impregnated in the separator 23.

3. Third Embodiment

In a third embodiment, a laminate film type nonaqueous electrolyte battery using the separator according to the first embodiment will be described.

(3-1) Structure of Nonaqueous Electrolyte Battery

Figure 7:
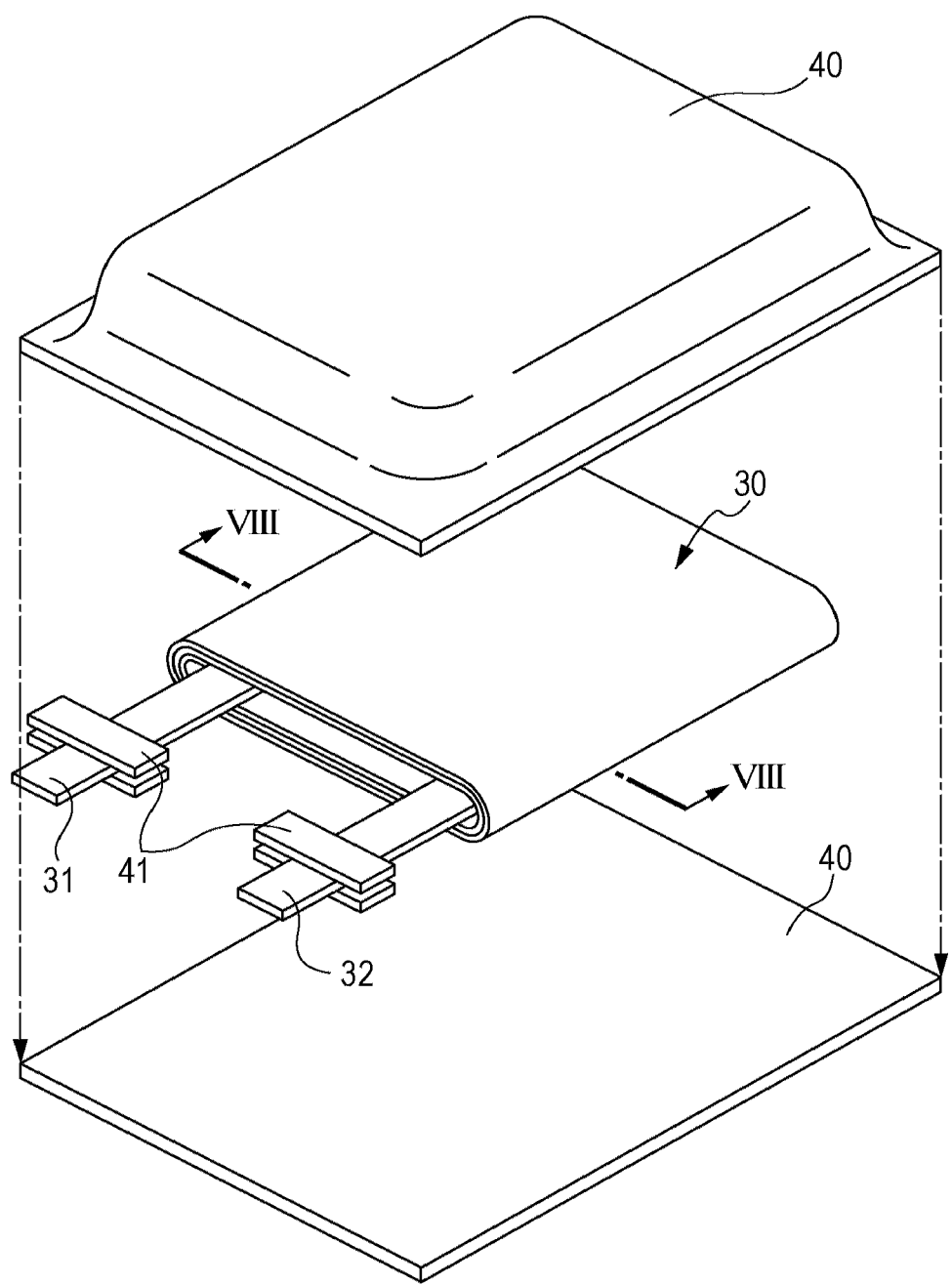
FIG. 7 is an exploded perspective view of the structure of a nonaqueous electrolyte battery according to a third embodiment of the present disclosure.

FIG. 7 is an exploded perspective view of the structure of the nonaqueous electrolyte battery according to the third embodiment. This nonaqueous electrolyte battery is a so-called laminate film type, and a wound electrode body 30 provided with a positive electrode lead 31 and a negative electrode lead 32 is accommodated between two exterior members 40 each having a film shape.

The positive electrode lead 31 and the negative electrode lead 32 are extended from between the exterior members 40 to the outside, for example, in the same direction. The positive electrode lead 31 and the negative electrode lead 32 are each formed of a metal material, such as aluminum, copper, nickel, or stainless steel, and each have a thin-plate shape or a network shape.

The exterior members 40 are each formed, for example, of a laminate film in which resin layers are formed on two surfaces of a metal layer. The laminate film is formed such that an exterior resin layer is formed on a surface of the metal layer which is exposed to the outside of the battery and an interior resin layer is formed on an inner surface of the metal layer which faces power generation elements, such as the wound electrode body 30.

The metal layer has the most important function to prevent intrusion of moisture, oxygen, and light for protection of the content and is most frequently formed from aluminum (Al) in view of light weight, extensibility, price, and good workability. The exterior resin layer has good appearance, toughness, flexibility, and the like and is formed from a resin material, such as a nylon or a poly(ethylene terephthalate) (PET). Since the interior resin layers of the respective exterior members 40 are melted by application of heat or ultrasonic waves and are welded to each other, a polyolefin resin is appropriately used, and a cast polypropylene (CPP) is frequently used. If necessary, between the metal layer and the exterior resin layer and/or between the metal layer and the interior resin layer, an adhesive layer may be provided.

One of the exterior members 40 has a recess portion formed in a direction from an interior resin layer side to an exterior resin layer side by deep drawing or the like, and the interior resin layer is formed to face the wound electrode body 30. The interior resin layers of the respective exterior members 40 facing each other are adhered to each other along the periphery of the recess portion by welding or the like. Adhesive films 41 for improving adhesive properties between the positive electrode lead 31 and the exterior members 40 and between the negative electrode lead 32 and the exterior members 40, each electrode lead being formed of a metal material, are arranged around a part of the positive electrode lead 31 and around a part of the negative electrode lead 32, respectively, and are sandwiched between the exterior members 40. The adhesive film 41 is formed of a resin material having high adhesive properties with a metal material and is formed, for example, from an olefin resin, such as a polyethylene, a polypropylene, a modified polyethylene, or a modified polypropylene.

In addition, instead of using the aluminum laminate film having a metal layer formed of aluminum (Al), the exterior member 40 may also be formed from a laminate film having a different structure, a polymer film, such as a polypropylene film, or a metal film.

Figure 8:
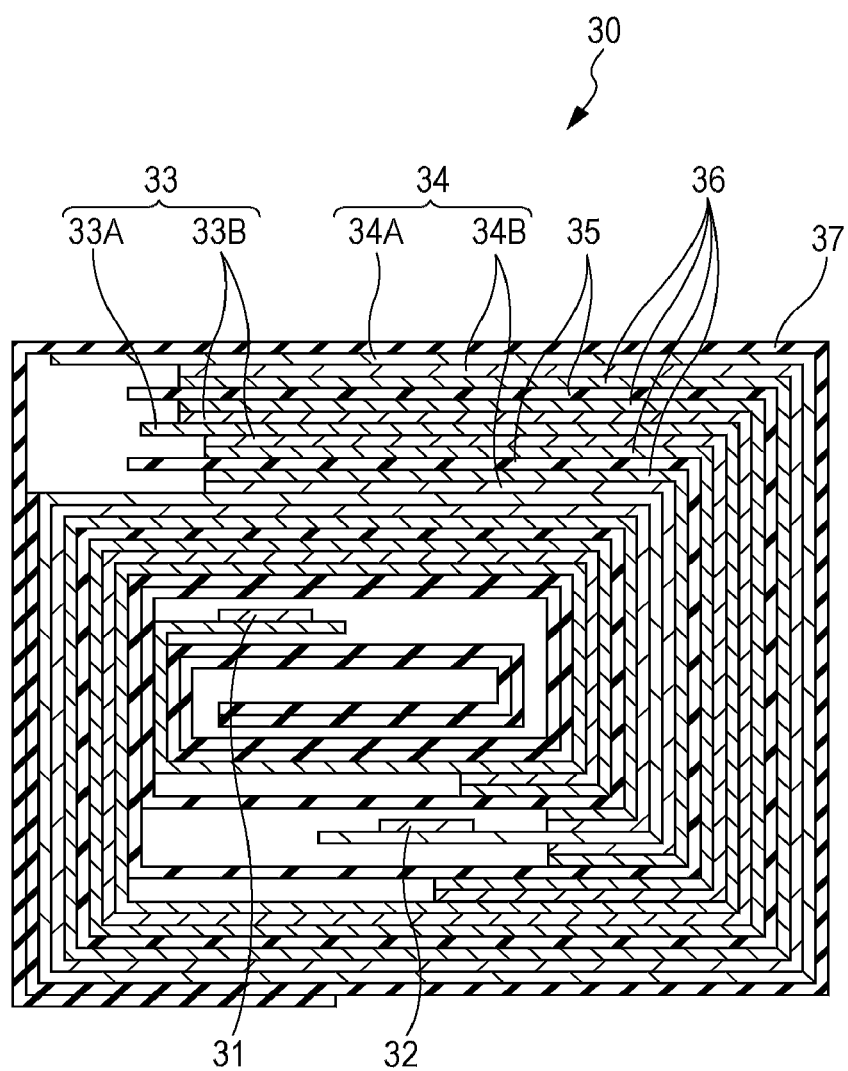
FIG. 8 is a cross-sectional view of the structure of the wound electrode body taken along the line VIII-VIII shown in FIG. 7.

FIG. 8 shows a cross-section structure of the wound electrode body 30 taken along the line VIII-VIII shown in FIG. 7. The wound electrode body 30 is formed by laminating and winding a positive electrode 33 and a negative electrode 34 with separators 35 and a nonaqueous electrolyte 36 provided therebetween, and the outermost peripheral portion of the wound electrode body 30 is protected by a protective tape 37.

[Positive Electrode]

The positive electrode 33 has the structure in which one or two positive electrode active material layers 33B are provided on one or two surfaces of a positive electrode collector 33A. The structure of the positive electrode collector 33A and that of the positive electrode active material layer 33B are similar to the structure of the positive electrode collector 21A and that of the positive electrode active material layer 21B of the above second embodiment, respectively.

[Negative Electrode]

The negative electrode 34 has the structure in which one or two negative electrode active material layers 34B are provided on one or two surfaces of a negative electrode collector 34A, and the negative electrode active material layer 34B and the positive electrode active material layer 33B are disposed to face each other. The structure of the negative electrode collector 34A and that of the negative electrode active material layer 34B are similar to the structure of the negative electrode collector 22A and that of the negative electrode active material layer 22B of the above second embodiment, respectively.

[Separator]

The separator 35 is similar to the separator 1 according to the first embodiment.

[Nonaqueous Electrolyte]

The nonaqueous electrolyte 36 is a nonaqueous electrolyte according to the third embodiment and has a so-called gel form containing a nonaqueous electrolyte and a polymer compound functioning to retain the nonaqueous electrolyte. Since a high ion conductivity can be obtained, and leakage of the electrolyte from the battery can also be prevented, the gel electrolyte is preferable.

As the polymer compound, for example, there may be mentioned an ether-based polymer compound, such as a polyethylene oxide or a cross-linked material containing a polyethylene oxide; an ester-based polymer compound or an acrylate-based polymer compound, such as a polymethacrylate; and a vinylidene fluoride polymer, such as a poly(vinylidene fluoride) or a vinylidene fluoride-hexafluoropropylene copolymer, and those mentioned above may be used alone or in combination. In particular, in view of an oxidation-reduction stability, a fluorine-based polymer compound, such as a vinylidene fluoride polymer, is preferably used.

(3-2) Method for Manufacturing Nonaqueous Electrolyte Battery

For example, this nonaqueous electrolyte battery can be manufactured as described below.

[Method for Manufacturing Positive Electrode and Negative Electrode]

The positive electrode 33 and the negative electrode 34 can be formed by a method similar to that of the second embodiment.

[Assembly of Nonaqueous Electrolyte Battery]

On two surfaces of each of the positive electrode 33 and the negative electrode 34, a precursor solution containing the nonaqueous electrolyte, the polymer compound, and a mixed solvent is applied, and the mixed solvent is removed by evaporation to form the nonaqueous electrolyte 36. Subsequently, the positive electrode lead 31 is fitted to an end of the positive electrode collector 33A by welding, and the negative electrode lead 32 is also fitted to an end of the negative electrode collector 34A by welding.

Next, after the positive electrode 33 and the negative electrode 34 in each of which the nonaqueous electrolyte 36 is formed are laminated with the separators 35 provided therebetween to form a laminate, this laminate is wound along a longitudinal direction thereof, and the protective tape 37 is adhered to the outermost peripheral portion of the laminate to form the wound electrode body 30. Finally, for example, the wound electrode body 30 is sandwiched between the exterior members 40, and the peripheries thereof are adhered to each other and sealed by heat sealing or the like. At this stage, the adhesion films 41 are provided around the part of the positive electrode lead 31 and around the part of the negative electrode lead 32 and are sandwiched between the exterior members 40. Accordingly, the nonaqueous electrolyte battery shown in FIGS. 7 and 8 is completed.

In addition, this nonaqueous electrolyte battery may also be formed as described below. First, as described above, after the positive electrode 33 and the negative electrode 34 are formed, and the positive electrode lead 31 and the negative electrode lead 32 are fitted to the positive electrode 33 and the negative electrode 34, respectively, the positive electrode 33 and the negative electrode 34 are laminated and wound with the separators 35 provided therebetween, and the protective tape 37 is adhered to the outermost peripheral portion, thereby forming a wound body functioning as a precursor of the wound electrode body 30. Next, this wound body is sandwiched between the exterior members 40, and peripheral portions of one exterior member 40 except one peripheral portion thereof are thermally welded to peripheral portions of the other exterior member 40 except one peripheral portion to form a bag shape, and the wound body is accommodated therein. Subsequently, a nonaqueous electrolyte composition containing the nonaqueous electrolyte, a polymerization initiator, a monomer of a raw material of the polymer compound, and, if necessary, other materials, such as a polymerization inhibitor, is prepared and is supplied between the exterior members 40 having a bag shape.

After the nonaqueous electrolyte composition is supplied, an opening portion formed by the exterior members 40 is sealed in a vacuum atmosphere by heat sealing. Next, the monomer is polymerized by heating into the polymer compound to form the gel nonaqueous electrolyte 36, so that the nonaqueous electrolyte battery shown in FIGS. 7 and 8 is assembled.

4. Fourth Embodiment

According to a fourth embodiment, a battery pack including a nonaqueous electrolyte battery using the separator according to the first embodiment will be described.

Figure 9:
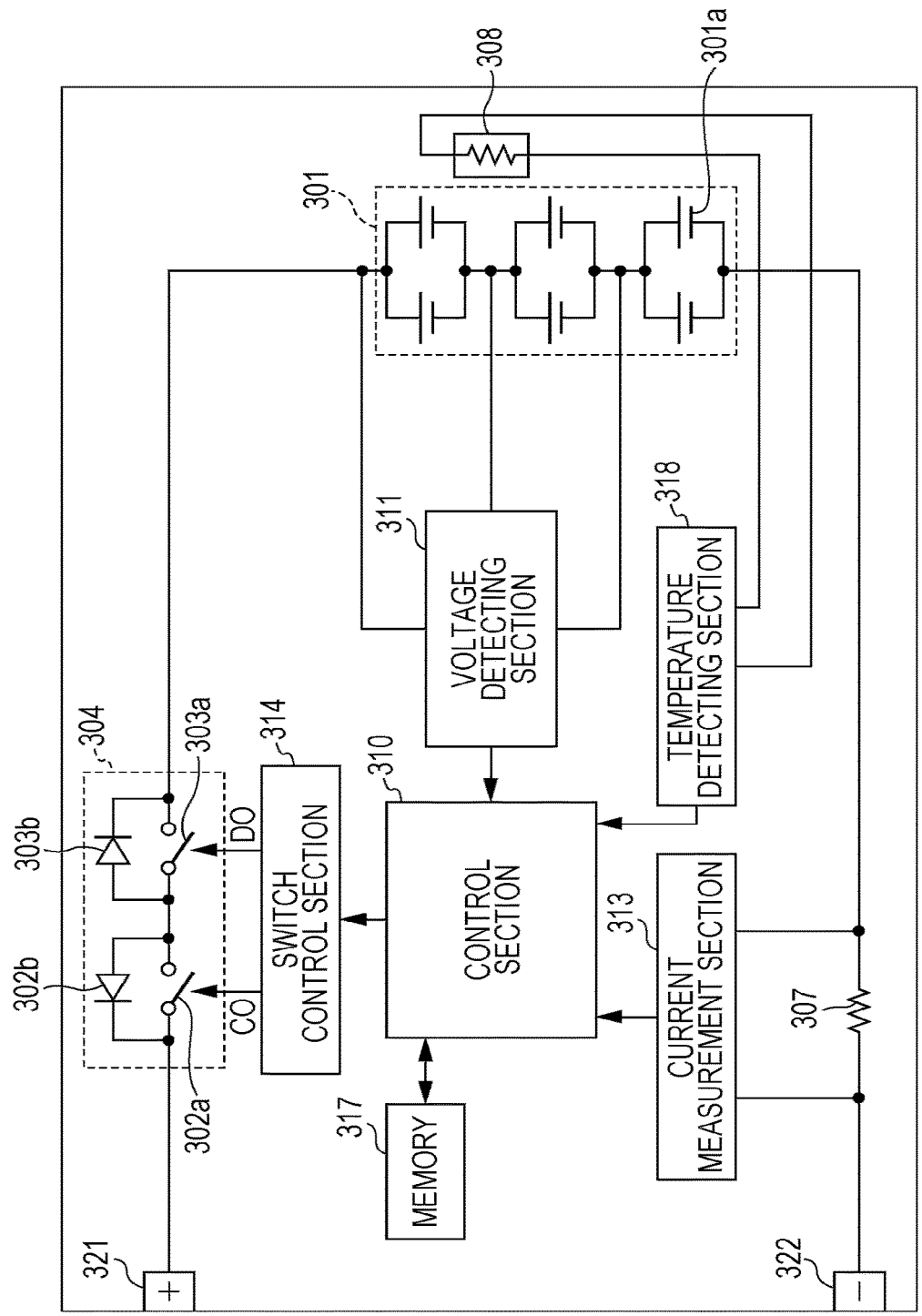
FIG. 9 is a block diagram of a configuration example of a battery pack according to an embodiment of the present disclosure.

FIG. 9 is a block diagram showing a circuit configuration example obtained when the nonaqueous electrolyte battery according to the embodiment of the present disclosure is applied to a battery pack. The battery pack includes an assembled battery 301, an exterior package, a switch section 304 having a charge control switch 302a and a discharge control switch 303a, a current detecting resistor 307, a temperature detecting element 308, and a control section 310.

In addition, the battery pack has a positive electrode terminal 321 and a negative electrode terminal 322, and at the time of charge, the positive electrode terminal 321 and the negative electrode terminal 322 are connected to a positive electrode terminal and a negative electrode terminal, respectively, of a battery charger, so that charge is performed. In addition, when an electronic apparatus is used, the positive electrode terminal 321 and the negative electrode terminal 322 are connected to a positive electrode terminal and a negative electrode terminal, respectively, of the electronic apparatus, so that discharge is performed.

The assembled battery 301 is formed of a plurality of nonaqueous electrolyte batteries 301a which are connected in series and/or in parallel. This nonaqueous electrolyte battery 301a is the nonaqueous electrolyte battery according to the embodiment of the present disclosure. In addition, although the case in which six nonaqueous electrolyte batteries 301a are connected in a manner of two parallel/three series (2P3S) is shown in FIG. 9, any other connection methods, such as n parallel/m series (n and m each indicate integer), may be used.

The switch section 304 includes the charge control switch 302a and a diode 302b and the discharge control switch 303a and a diode 303b and is controlled by the control section 310. The diode 302b has a polarity in a direction opposite to a direction of a charge current flowing from the positive electrode terminal 321 to the assembled battery 301 and in the same direction as that of a discharge current flowing from the negative electrode terminal 322 to the assembled battery 301. The diode 303b has a polarity in the same direction as that of the charge current and in a direction opposite to that of the discharge current. Although provided at the + side in the example, the switch section 304 may be provided at the − side.

The charge control switch 302a is placed in an OFF state when a battery voltage reaches an overcharge detection voltage, and the charge current is controlled by the control section 310 so as not to flow in a current path of the assembled battery 301. After the charge control switch 302a is placed in an OFF state, discharge can only be performed through the diode 302b. In addition, when a large current flows at the time of charge, the charge control switch 302a is placed in an OFF state, and the control section 310 controls so as to block the charge current flowing in the current path of the assembled battery 301.

The discharge control switch 303a is placed in an OFF state when a battery voltage reaches an overdischarge detection voltage, and the discharge current is controlled by the control section 310 so as not to flow in the current path of the assembled battery 301. After the discharge control switch 303a is placed in an OFF state, charge can only be performed through the diode 303b. In addition, when a large current flows at the time of discharge, the discharge control switch 303a is placed in an OFF state, and the control section 310 controls so as to block the discharge current flowing through the current path of the assembled battery 301.

The temperature detecting element 308 is, for example, a thermistor, is provided in the vicinity of the assembled battery 301, measures the temperature thereof, and supplies information of the temperature thus measured to the control section 310. A voltage detecting section 311 measures the voltage of the assembled battery 301 and that of each nonaqueous electrolyte battery 301a forming the assembled battery 301, and after A/D conversion of the measured voltages is performed, the converted values are supplied to the control section 310. A current measurement section 313 measures a current using the current detecting resistor 307 and supplies information of this measured current to the control section 310.

A switch control section 314 controls the charge control switch 302a and the discharge control switch 303a of the switch section 304 based on the voltage and the current inputted from the voltage detecting section 311 and the current measurement section 313, respectively. When the voltage of any one of the nonaqueous electrolyte batteries 301a is higher than the overcharge detection voltage or lower than the overdischarge detection voltage, or when a large current rapidly flows, the switch control section 314 supplies a control signal to the switch section 304 to prevent overcharge, overdischarge, and overcurrent.

For example, in the case in which the nonaqueous electrolyte battery is a lithium ion secondary battery, the overcharge detection voltage is set, for example, to 4.20 V±0.05 V, and the overdischarge detection voltage is set, for example, to 2.4 V±0.1V.

As a charge/discharge switch, for example, a semiconductor switch, such as a MOSFET, may be used. In this case, parasitic diodes of the MOSFET function as the diodes 302b and 303b. When a p-channel type FET is used as the charge/discharge switch, the switch control section 314 supplies control signals DO and CO to gates of the charge control switch 302a and the discharge control switch 303a, respectively. When the charge control switch 302a and the discharge control switch 303a are each a p-channel type, the switch is placed in an ON state when the gate potential is lower than the source potential by a predetermined value. That is, in usual charge and discharge operations, the control signals CO and DO are each set at a low level, and the charge control switch 302a and the discharge control switch 303a are each placed in an ON state.

In addition, for example, at the time of overcharge or overdischarge, the control signals CO and DO are each set at a high level, and the charge control switch 302a and the discharge control switch 303a are each placed in an OFF state.

A memory 317 is a RAM or a ROM and is, for example, an EPROM (Erasable Programmable Read Only Memory) which is a non-volatile memory. Numerical values calculated by the control section 310, and internal resistance and the like of the battery in an initial state of each nonaqueous electrolyte battery 301a measured at the manufacturing stage are stored in the memory 317 in advance and can also be appropriately rewritten. In addition, when a full charge capacity of the nonaqueous electrolyte battery 301a is stored, for example, a remaining battery capacity can be calculated in cooperation with the control section 310.

A temperature detecting section 318 measures the temperature using the temperature detecting element 308 and performs charge/discharge control at the time of abnormal heat generation and/or correction in calculation of the remaining battery capacity.

5. Fifth Embodiment

In a fifth embodiment, apparatuses, such as an electronic apparatuses, an electric vehicle, and an electric power storage device, which include at least one of the nonaqueous electrolyte batteries according to the second and the third embodiments and the battery pack according to the fourth embodiment, will be described. The nonaqueous electrolyte battery and the battery pack described in the second to the fourth embodiment can be used in order to supply an electric power to the apparatuses, such as an electronic apparatus, an electric vehicle, and an electric power storage device.

As the electronic apparatus, for example, there may be mentioned a notebook personal computer, a PDA (Personal Digital Assistant), a cellular phone, a cordless phone handset, a video movie, a digital still camera, a digital book, an electronic dictionary, a music player, a radio, a headphone, a game machine, a navigation system, a memory card, a pacemaker, a hearing aid, an electric power tool, an electric shaver, a refrigerator, an air-conditioner, a television, a stereo set, a water heater, a microwave oven, a dishwasher, a washing machine, a dry oven, a lighting instrument, a toy, a medical instrument, a robot, a load conditioner, and a signaler.

In addition, as the electric vehicle, for example, there may be mentioned a rail car, a golf cart, an electric cart, and an electric car (including a hybrid car), and the nonaqueous electrolyte battery or the battery pack are used as drive power sources or assistant power sources thereof.

As the electric power storage device, for example, there may be mentioned an electric power storage source for buildings, such as a home, or power generation facilities.

Hereinafter, among the application examples mentioned above, a concrete example of an electric power storage system using an electric power storage device to which the nonaqueous electrolyte battery according to the embodiment of the present disclosure is applied will be described.

This electric power storage system may have, for example, the following structures. A first electric power storage system is an electric power storage system in which an electric power storage device is charged by a power generator which performs power generation using recyclable energy. A second electric power storage system is an electric power storage system which has an electric power storage device and which supplies an electric power to an electronic apparatus connected to the electric power storage device. A third electric power storage system is an electronic apparatus which receives supply of an electric power from an electric power storage device. These electric power storage systems are each a system configured to efficiently supply an electric power in corporation with an external power source network.

Furthermore, a fourth electric power storage system is an electric vehicle having a conversion device converting an electric power supplied from an electric power storage device to a driving force of a vehicle and a control device performing information processing relating to vehicle control based on information on the electric power storage device. A fifth electric power storage system is an electric power system having an electric power information transmit-receive section which transmits and receives signals to and from other apparatuses through a network and performing charge/discharge control of the electric power storage device described above based on the information received by the transmit-receive section. A sixth electric power storage system is an electric power system which receives an electric power from the electric power storage device described above or supplies an electric power to the electric power storage device from a power generator or an electric power network. Hereinafter, the electric power storage system will be described.

(5-1) Electric Power Storage System for Home as Application Example

Figure 10:
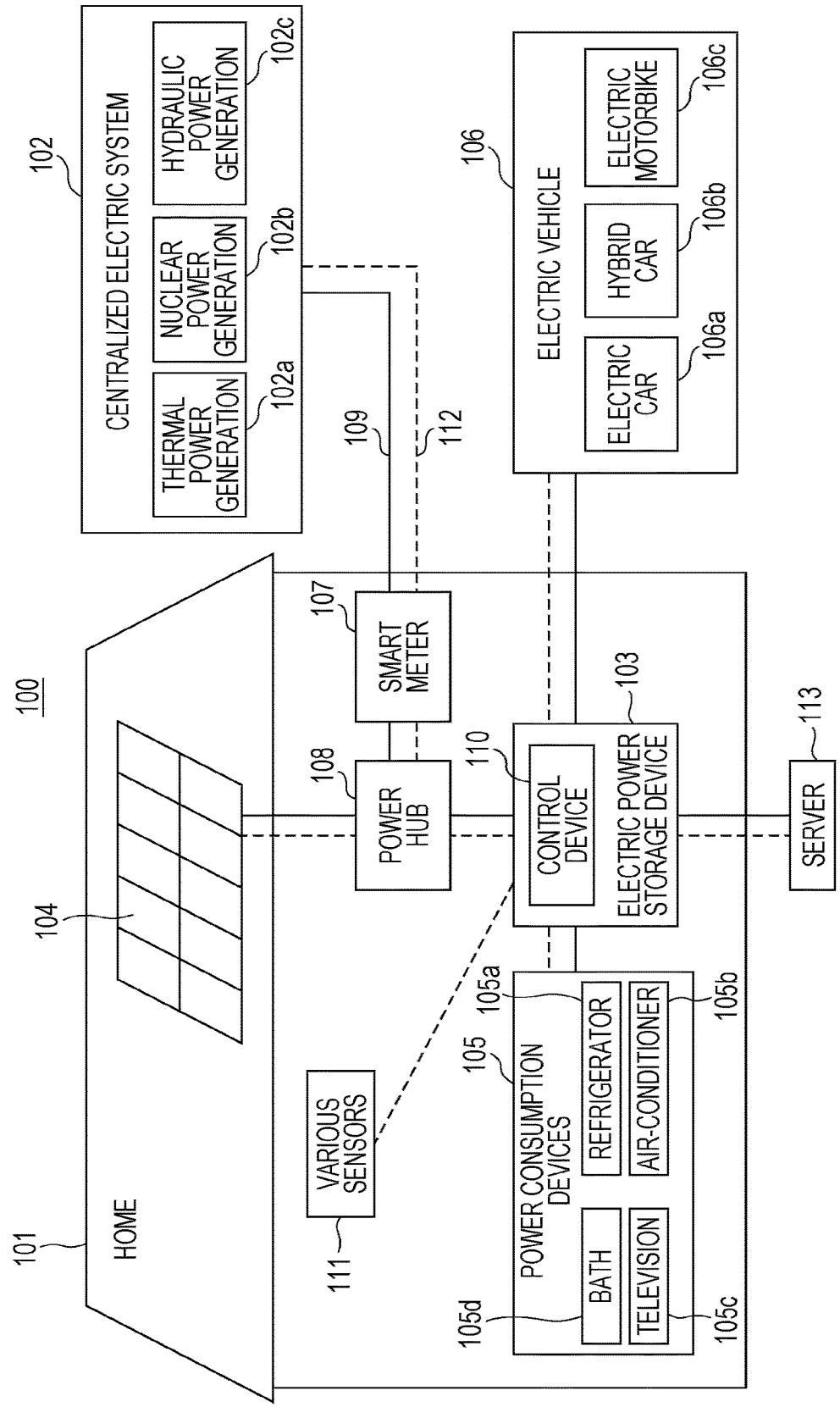
FIG. 10 is a schematic view of one example of an electric power storage system for home use using the nonaqueous electrolyte battery according to an embodiment of the present disclosure.

An example in which an electric power storage device using the nonaqueous electrolyte battery according to the embodiment of the present disclosure is applied to an electric power storage system for home use will be described with reference to FIG. 10. For example, in an electric power storage system 100 for a home 101, an electric power is supplied to an electric power storage device 103 from a centralized electric system 102 including thermal power generation 102a, nuclear power generation 102b, and hydraulic power generation 102c, through an electric power network 109, an information network 112, a smart meter 107, a power hub 108, and the like. In addition to the above, an electric power is also supplied to the electric power storage device 103 from an independent power source, such as a home electric power generator 104. The electric power supplied to the electric power storage device 103 is stored. An electric power used in the home 101 is supplied using the electric power storage device 103. An electric power storage system similar to that described above may also be used for a building as well as for the home 101.

In the home 101, there are provided the home electric power generator 104, electric power consumption devices 105, the electric power storage device 103, a control device 110 controlling various devices, the smart meter 107, and sensors 111 which obtain various types of information. The individual devices are each connected by the electric power network 109 and the information network 112. As the home electric power generator 104, for example, a solar battery and/or a fuel cell is used, and the electric power generated thereby is supplied to the electric power consumption devices 105 and/or the electric power storage device 103. As the electric power consumption devices 105, for example, a refrigerator 105*a*, an air-conditioner 105*b*, a television set 105*c*, a bath 105*d* may be mentioned. Furthermore, an electric vehicle 106 is one of the electric power consumption devices 105. As the electric vehicle 106, for example, an electric car 106*a*, a hybrid car 106*b*, and an electric motorbike 106*c* may be mentioned.

The nonaqueous electrolyte battery according to the embodiment of the present disclosure is applied to the electric power storage device 103. The nonaqueous electrolyte battery according to the embodiment of the present disclosure may be formed, for example, of the lithium ion secondary battery described above. The smart meter 107 has a function to measure usage of a commercial electric power and to send the measured usage to an electric power company. The electric power network 109 may include any one of direct-current electric supply, alternating-current electric supply, and non-contact electric supply, or may include at least two thereof in combination.

As the various types of sensors 111, for example, a human sensing sensor, an illuminance sensor, an object detection sensor, a power consumption sensor, a vibration sensor, a contact sensor, a temperature sensor, and an infrared sensor may be mentioned. Information obtained by the various types of sensors 111 are sent to the control device 110. By the information sent from the sensors 111, weather conditions, personal conditions, and the like are understood, and the electric power consumption devices 105 can be automatically controlled, so that energy consumption can be decreased to the minimum. Furthermore, the control device 110 is able to send information on the home 101 to an external electric power company and the like through the Internet.

By the power hub 108, treatments, such as branching of electric power lines and direct current/alternating current conversion, are performed. As a communication method of the information network 112 connected to the control device 110, for example, there may be mentioned a method using a communication interface, such as UART (Universal Asynchronous Receiver-Transceiver) and a method using a sensor network based on wireless communication standards, such as Bluetooth, ZigBee, and Wi-Fi. The Bluetooth method is applied to multimedia communication, and point-to-multipoint connection communication can be performed. In the ZigBee, a physical layer of IEEE (Institute of Electrical and Electronics Engineers) 802.15.4 is used. The IEEE 802.15.4 is the name of a short-range wireless network standard, which is referred to as PAN (Personal Area Network) or W (Wireless) PAN.

The control device 110 is connected to an external server 113. This server 113 may be managed by any one of the home 101, the electric power company, and a service provider. Information transmitted and received by the server 113 is information, such as power consumption information, life pattern information, power rate information, weather information, natural disaster information, and electricity transaction information. These types of information may be transmitted and received by a home electric power consumption device (such as a television set) or may be transmitted and received by a device outside the home (such as a cellular phone). These types of information may be displayed on an apparatus having a display function, such as a television set, a cellular phone, or a PDA (Personal Digital Assistants).

The control device 110 controlling the individual sections is formed of a CPU (Central Processing Unit), a RAM (Random Access Memory), a ROM (Read Only Memory), and the like and is accommodated in the electric power storage device 103 in this example. The control device 110 is connected to the electric power storage device 103, the home electric power generator 104, the electric power consumption devices 105, the various types of sensors 111, and the server 113 by the information network 112 and has a function, for example, to adjust the usage of the commercial electric power and the production of electricity. In addition, the control device 110 may also have a function to perform electricity transactions on the electricity market.

As described above, besides the electric power supplied by the centralized electric system 102 including the thermal power generation 102*a*, the nuclear power generation 102*b*, and the hydraulic power generation 102*c*, the electric power generated by the home electric power generator 104 (photovoltaic power generation and/or wind power generation) can be stored in the electric power storage device 103. Therefore, even if the electric power generated by the home electric power generator 104 is changed, the control can be performed so that the electric energy sent to the outside is made constant or so that discharge is performed as necessary. For example, electric power management may be performed in such a way that the electric power obtained by photovoltaic power generation is stored in the electric power storage device 103, inexpensive midnight electric power is also stored therein during nighttime, and the electric power stored in the electric power storage device 103 is used during daytime in which an electric power rate is high.

Although the case in which the control device 110 is accommodated in the electric power storage device 103 is described in this example, the control device 110 may be accommodated in the smart meter 107 or may be independently provided. Furthermore, the electric power storage system 100 may be used for a plurality of homes in collective housing or may also be used for a plurality of single-family homes.

(5-2) Electric Power Storage System for Vehicle as Application Example

Figure 11:
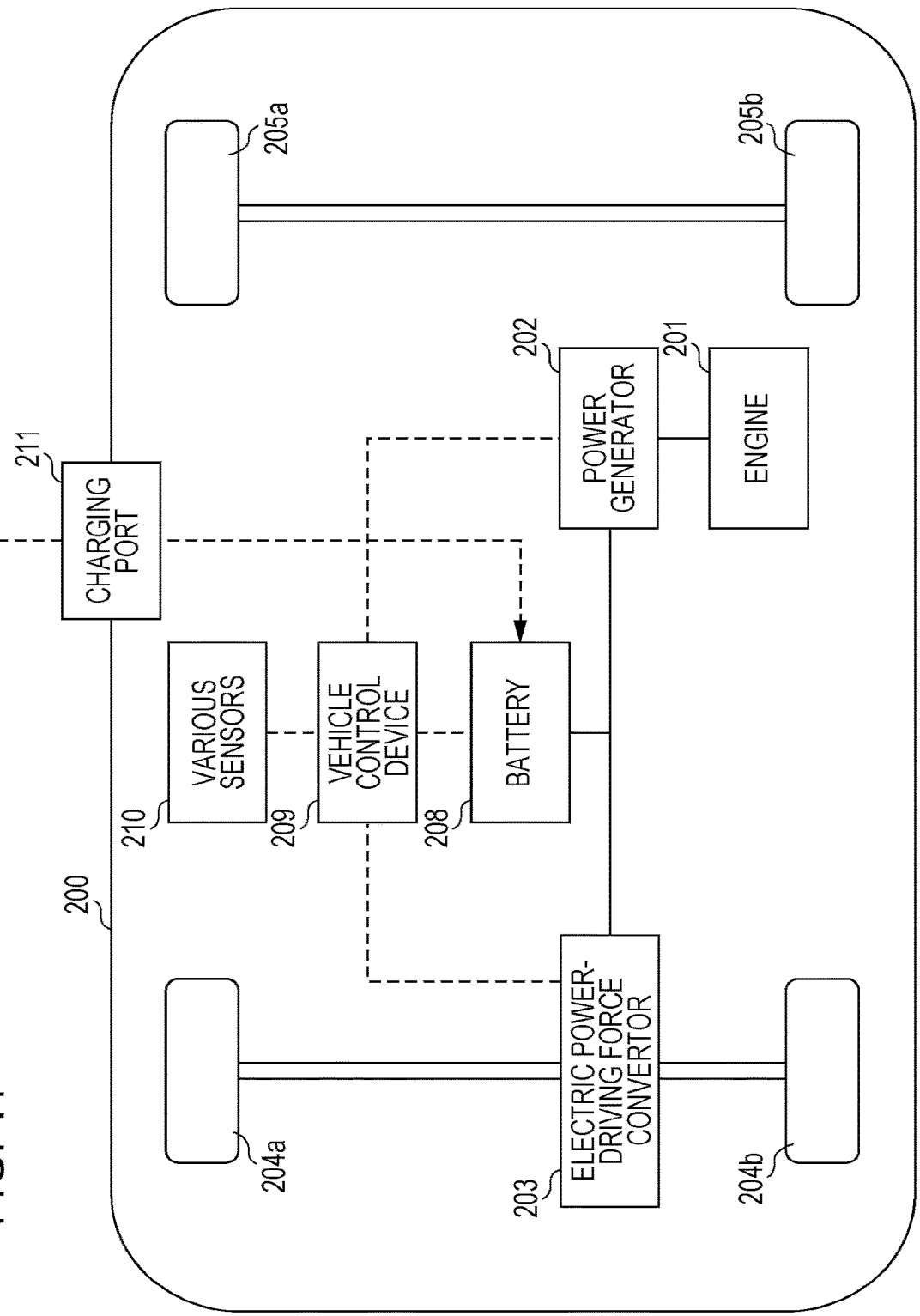
FIG. 11 is a schematic view of one example of the structure of a hybrid vehicle using a series hybrid system according to an embodiment of the present disclosure.

An example in which the present disclosure is applied to an electric power storage system for vehicle use will be described with reference to FIG. 11. FIG. 11 is a schematic view showing one example of the structure of a hybrid vehicle which adopts a series hybrid system to which the present disclosure is applied. A hybrid vehicle 200 using a series hybrid system is a car traveling by an electric power-driving force convertor using an electric power generated by a generator driven by an engine or an electric power which is once stored in a battery after being generated.

This hybrid vehicle 200 includes an engine 201, a power generator 202, an electric power-driving force convertor 203, a driving wheel 204a, a driving wheel 204b, a wheel 205a, a wheel 205b, a battery 208, a vehicle control device 209, various sensors 210, and a charging port 211. The above-described nonaqueous electrolyte battery according to the embodiment of the present disclosure is applied to the battery 208.

The hybrid vehicle 200 travels by using the electric power-driving force converter 203 as a power source. One example of the electric power-driving force converter 203 is a motor. By an electric power of the battery 208, the electric power-driving force convertor 203 is activated, and the torque thereof is transmitted to the driving wheels 204a and 204b. In addition, when a direct current-alternating current (DC-AC) convertor or a reverse (AC-DC) convertor is used at a necessary position, the electric power-driving force converter 203 can be applied to either an alternating-current motor or a direct-current motor. Through the vehicle control device 209, the various sensors 210 control the number of rotations of the engine and/or the opening (throttle opening) of a throttle valve (not shown). The various sensors 210 include a velocity sensor, an acceleration sensor, and engine rotation speed sensor, and the like.

The torque of the engine 201 is transmitted to the power generator 202, and by this torque, the electric power generated by the power generator 202 can be stored in the battery 208.

When the hybrid vehicle 200 is deaccelerated by a brake mechanism (not shown), the resistance at the time of deacceleration is transmitted to the electric power-driving force converter 203 as the torque, and by this torque, a regenerative electric power generated by the electric power-driving force convertor 203 is stored in the battery 208.

Since being connected to an exterior power source of the hybrid vehicle 200, the battery 208 receives an electric power supply from the exterior power source through the charging port 211 functioning as an input port and can also store the electric power thus received.

Although not shown in the figure, there may also be provided an information processing device performing information processing relating to vehicle control based on information relating to the nonaqueous electrolyte battery. As the information processing device described above, for example, there may be mentioned an information processing device which displays a remaining battery capacity based on the information thereof.

Heretofore, the series hybrid car has been described by way of example which travels by a motor using an electric power which is generated by a generator driven by an engine or an electric power which is once stored in a battery after being generated. However, the present disclosure can also be effectively applied to a parallel hybrid car using an output of an engine and an output of a motor as driving sources in which three driving modes, that is, driving only by the motor, driving only by the engine, and driving in combination thereof, are appropriately selected. Furthermore, the present disclosure can also be effectively applied to a so-called electric vehicle which travels only by a drive motor without using an engine.

EXAMPLES

Hereinafter, the present disclosure will be described in detail with reference to Examples and Comparative Examples.

Reference Examples 1 to 5

In Reference Examples 1 to 5, properties of resin films were evaluated by using non-porous resin films formed from different resin materials, and the properties of the copolymer according to the embodiment of the present disclosure were investigated. In the separator according to the embodiment of the present disclosure, since the substrate and the surface layer each have a porous structure, the following evaluation was regarded as the reference.

Reference Example 1

A vinylidene fluoride (VdF)-tetrafluoroethylene (TFE)-hexafluoropropylene (HFP) copolymer (NEOFLON VT470, manufactured by Daikin Industries, LTD.) was formed into a film having a thickness of 32 μm as the resin film.

Reference Example 2

A poly(vinylidene fluoride) (KF polymer W#7200, manufactured by Kureha Chemical Industry Co., Ltd) having a mass average molecular weight of 630,000 was formed into a film having a thickness of 30 μm as the resin film.

Reference Example 3

A poly(vinylidene fluoride) (KF polymer W#7300, manufactured by Kureha Chemical Industry Co., Ltd) having a mass average molecular weight of 1,000,000 was formed into a film having a thickness of 31 μm as the resin film.

Reference Example 4

A vinylidene fluoride (VDF)-maleic monomethyl ester (MMM) copolymer (KF polymer W#9200, manufactured by Kureha Chemical Industry Co., Ltd) having a mass average molecular weight of 500,000 was formed into a film having a thickness of 29 μm as the resin film.

Reference Example 5

A vinylidene fluoride-hexafluoropropylene (HFP)-maleic monomethyl ester (MMM) copolymer (KF polymer W#9300, manufactured by Kureha Chemical Industry Co., Ltd) having a mass average molecular weight of 500,000 was formed into a film having a thickness of 30 μm as the resin film.

[Evaluation of Resin Film]
(a) Tear Test

The separator of each of the above Reference Examples was evaluated by the trouser tear method in accordance with JIS K 7128-1. The separator of each of the above Reference Examples was cut into a test sample having a length of 150 mm and a width of 50 mm, and a slit having a length of 75 mm was formed in the test sample from one end thereof.

Figure 12:
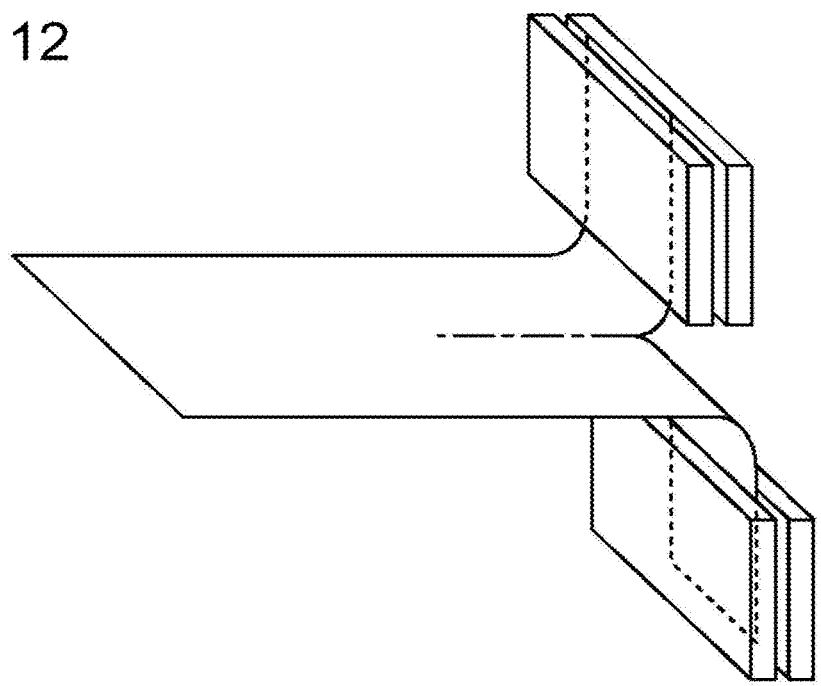
FIG. 12 is a schematic view showing a test method of a tear test.

Subsequently, the two ends of the test sample with the slit provided therebetween were chucked by a precision universal testing machine (AG-100D, manufactured by Shimadzu Corp.) and were pulled in different directions thereby as shown in FIG. 12, and a tear force of the test sample was measured. In this evaluation, a test speed was set to 200 mm/min. The tear strength was calculated from the following formula.

Tear strength [N/cm]=tear force N/thickness of test sample (b) Break Test

A load was applied to two ends of the separator of each of the Reference Examples by the above precision universal testing machine, and the elongation of the separator was obtained when the separator was fractured. The elongation after fracture was obtained as a ratio of an elongation amount at the fracture (length L at fracture-length $L_0$ before test) to the length $L_0$ before test.

Elongation after fracture [%]={(length L at fracture-length $L_0$ before test)/length $L_0$ before test}×100

The evaluation results of each of Reference Examples are shown in the following Table 1.

TABLE 1

|  | MOLECULAR WEIGHT | ELASTIC MODULUS [MPa] | MAXIMUM STRESS [MPa] | ELONGATION AFTER FRACTURE [%] | TEAR STRENGTH [N/cm] |
|---|---|---|---|---|---|
| REFERENCE EXAMPLE 1 | — | 117 | 22.5 | 360.0 | NOT TORN (ELONGATED) |
| REFERENCE EXAMPLE 2 | 630,000 | 1827 | 56.0 | 73.3 | 130 |
| REFERENCE EXAMPLE 3 | 1,000,000 | 1413 | 51.3 | 180.8 | 110 |
| REFERENCE EXAMPLE 4 | 500,000 | 2313 | 58.2 | 68.6 | 120 |
| REFERENCE EXAMPLE 5 | 1,000,000 | 1415 | 58.4 | 268.0 | 240 |

As shown in Table 1, the resin film of Reference Example 1 using the copolymer according to the embodiment of the present disclosure had a significantly large elongation after fracture as compared to that of each of Reference Examples 2 to 5. In addition, in the tear test, a tear was not generated from the slit portion, and since the resin film was elongated, the tear force was not obtained. As described above, it was found that the copolymer according to the embodiment of the present disclosure was suitably used for a surface layer having a function to suppress the substrate from being easily torn.

Examples 1-1 to 1-7, Comparative Examples 1-1 to 1-8, and Reference Example 1-1

In Examples 1-1 to 1-7, Comparative Examples 1-1 to 1-8, and Reference Example 1-1, a surface layer was provided on one surface of a substrate to form a separator, and properties thereof were evaluated by changing a resin material of the surface layer.

Example 1-1

As the resin material used for the surface layer, a vinylidene fluoride (VdF)-tetrafluoroethylene (TFE)-hexafluoropropylene (HFP) copolymer (NEOFLON VT470, manufactured by Daikin Industries, LTD.) was used. This copolymer was sufficiently dissolved in N-methyl-2-pyrrolidone to form a resin solution in which the above copolymer was dissolved at a concentration of 5.0 percent by mass.

Next, the above resin solution was applied to one surface of a porous polyolefin resin film having a thickness of 16 μm, which was the substrate, by a desk coater. As the substrate, a porous resin film was used in which porous polypropylene resin films were formed on two surfaces of a porous polyethylene resin film and which had a film-shaped laminate structure formed by a so-called dry method (that is, uniaxial drawing was used as a drawing method). Then, after the substrate coated with the resin solution was immersed in a water bath for 15 minutes for phase separation of the surface layer, drying was carried out by a hot wind, and as a result, a separator having a total thickness of 17.4 μm was obtained.

The surface layer of the separator thus obtained had a thickness of 1.4 μm, an area density of 0.094 mg/cm$^2$, and a porosity of 65.2%. In addition, the porosity of the substrate itself was 36.3%, and the air permeability of the separator including the surface layer was 471 sec/100 ml.

The porosity was measured as described below. First, the separator was cut off to have an area S[cm$^2$] as a sample, and the mass (W[g]) and the thickness (D[cm]) thereof were measured. Subsequently, the mass (Wi[g], i=1, 2, . . . , n) of a monomer unit of an i type (i=1, 2 . . . , n) forming the copolymer in the sample was obtained by calculation. Furthermore, the mass (Wi[g]) of each monomer unit was divided by its true density (di[g/cm$^3$]) to assume the volume of each monomer unit, and the porosity was calculated from the following formula.

Porosity [%]=100−{(mass W1/true density d1)+(mass W2/true density d2)+ . . . +(mass Wn/true density dn)}/(cut-off area S×thickness D)

Example 1-2

Except that the surface layer was formed using a resin solution in which the above copolymer was dissolved at a concentration of 6.0 percent by mass, a separator having a total thickness of 17.6 μm was formed using a method similar to that in Example 1-1.

The surface layer of the separator thus obtained had a thickness of 1.6 μm, an area density of 0.113 mg/cm$^2$, and a porosity of 63.4%. In addition, the air permeability of the separator including the surface layer was 466 sec/100 ml.

Example 1-3

Except that the surface layer was formed using a resin solution in which the above copolymer was dissolved at a concentration of 7.0 percent by mass, a separator having a total thickness of 17.8 μm was formed using a method similar to that in Example 1-1.

The surface layer of the separator thus obtained had a thickness of 1.8 μm, an area density of 0.126 mg/cm², and a porosity of 63.7%. In addition, the air permeability of the separator including the surface layer was 491 sec/100 ml.

Example 1-4

Except that the surface layer was formed using a resin solution in which the above copolymer was dissolved at a concentration of 8.0 percent by mass, a separator having a total thickness of 17.7 μm was formed using a method similar to that in Example 1-1.

The surface layer of the separator thus obtained had a thickness of 1.7 μm, an area density of 0.122 mg/cm², and a porosity of 62.8%. In addition, the air permeability of the separator including the surface layer was 470 sec/100 ml.

Example 1-5

Except that the surface layer was formed using a resin solution in which the above copolymer was dissolved at a concentration of 10.0 percent by mass, a separator having a total thickness of 18.1 μm was formed using a method similar to that in Example 1-1.

The surface layer of the separator thus obtained had a thickness of 2.1 μm, an area density of 0.193 mg/cm², and a porosity of 52.4%. In addition, the air permeability of the separator including the surface layer was 530 sec/100 ml.

Example 1-6

Except that the thickness of the surface layer was decreased as compared to that of Example 1-1, a separator having a total thickness of 17.2 μm was formed using a method similar to that in Example 1-1.

The surface layer of the separator thus obtained had a thickness of 1.2 μm, an area density of 0.063 mg/cm², and a porosity of 72.8%. In addition, the air permeability of the separator including the surface layer was 450 sec/100 ml.

Example 1-7

Except that the thickness of the surface layer was decreased as compared to that of Example 1-2, a separator having a total thickness of 16.5 μm was formed using a method similar to that in Example 1-2.

The surface layer of the separator thus obtained had a thickness of 0.5 μm, an area density of 0.063 mg/cm², and a porosity of 34.7%. In addition, the air permeability of the separator including the surface layer was 445 sec/100 ml.

Comparative Example 1-1

Except that instead of using the copolymer of Example 1-1, a vinylidene fluoride (VDF)-maleic monomethyl ester (MMM) copolymer (KF polymer W#9200, manufactured by Kureha Chemical Industry Co., Ltd) was used, and the surface layer was formed using a resin solution in which the above copolymer was dissolved at a concentration of 5.0 percent by mass, a separator having a total thickness of 19.3 μm was formed using a method similar to that in Example 1-1.

The surface layer of the separator thus obtained had a thickness of 3.3 μm, an area density of 0.096 mg/cm², and a porosity of 83.4%. In addition, the air permeability of the separator including the surface layer was 561 sec/100 ml.

Comparative Example 1-2

Except that instead of using the copolymer of Example 1-1, a vinylidene fluoride-hexafluoropropylene (HFP)-maleic monomethyl ester (MMM) copolymer (KF polymer W#9300, manufactured by Kureha Chemical Industry Co., Ltd) was used, and the surface layer was formed using a resin solution in which the above copolymer was dissolved at a concentration of 5.0 percent by mass, a separator having a total thickness of 17.2 μm was formed using a method similar to that in Example 1-1.

The surface layer of the separator thus obtained had a thickness of 1.2 μm, an area density of 0.159 mg/cm², and a porosity of 24.3%. In addition, since the surface layer was formed into a film, the air permeability of the separator including the surface layer could not be measured. The reason for this is believed since the molecular weight of the copolymer used for the surface layer was high.

Comparative Example 1-3

Except that instead of using the copolymer of Example 1-1, a poly(vinylidene fluoride) (KF polymer W#7300, manufactured by Kureha Chemical Industry Co., Ltd) having a mass average molecular weight of 1,000,000 was used, and the surface layer was formed using a resin solution in which the above poly(vinylidene fluoride) was dissolved at a concentration of 5.0 percent by mass, a separator having a total thickness of 18.8 μm was formed using a method similar to that in Example 1-1.

The surface layer of the separator thus obtained had a thickness of 2.8 μm, an area density of 0.120 mg/cm², and a porosity of 75.5%. In addition, the air permeability of the separator including the surface layer was 536 sec/100 ml.

Comparative Example 1-4

Except that instead of using the copolymer of Example 1-1, a poly(vinylidene fluoride) (KF polymer W#7300, manufactured by Kureha Chemical Industry Co., Ltd) having a mass average molecular weight of 1,000,000 was used, and the surface layer was formed using a resin solution in which the above poly(vinylidene fluoride) was dissolved at a concentration of 6.0 percent by mass, a separator having a total thickness of 17.4 μm was formed using a method similar to that in Example 1-1.

The surface layer of the separator thus obtained had a thickness of 1.4 μm, an area density of 0.124 mg/cm², and a porosity of 49.4%. In addition, since the surface layer was formed into a film, the air permeability of the separator including the surface layer could not be measured. The reason for this is believed since the molecular weight of the copolymer used for the surface layer was high and the concentration of the resin solution was also high.

Comparative Example 1-5

Except that instead of using the copolymer of Example 1-1, a poly(vinylidene fluoride) (KF polymer W#7200, manufactured by Kureha Chemical Industry Co., Ltd) having a mass average molecular weight of 630,000 was used, and the surface layer was formed using a resin solution in which the above poly(vinylidene fluoride) was dissolved at a concentration of 5.0 percent by mass, a separator having a total thickness of 18.1 μm was formed using a method similar to that in Example 1-1.

The surface layer of the separator thus obtained had a thickness of 2.1 μm, an area density of 0.076 mg/cm², and a porosity of 79.3%. In addition, the air permeability of the separator including the surface layer was 509 sec/100 ml.

Comparative Example 1-6

A poly(vinyl alcohol), which was a homopolymer of vinyl alcohol (VA), (PVA, manufactured by Sigma-Aldrich Co., mass average molecular weight Mw: 85,000 to 146,000) was used as the resin material for the surface layer, and a polyethylene glycol (PEG, manufactured by Sigma-Aldrich Co., number average molecular weight Mn: 400) was used as a plasticizer. First, after the polyvinyl alcohol (PVA) was sufficiently dissolved in water, the polyethylene glycol (PEG) was added, thereby forming a resin solution. The resin solution was prepared so that the polyvinyl alcohol (PVA) and the polyethylene glycol (PEG) were dissolved in water at a mass ratio of 20 to 80, and the concentration of the poly(vinyl alcohol) (PVA) in the resin solution was 5.0 percent by mass. Next, the above resin solution was applied to one surface of a porous polyolefin resin film having a thickness of 16 μm, which was the substrate, by a desk coater and was then dried. Subsequently, after the substrate which was coated with the resin solution and was then dried was immersed in ethanol for 30 minutes to extract the polyethylene glycol (PEG) for forming a porous material, drying was carried out by a hot wind, so that a separator having a total thickness of 17.0 μm was formed.

The surface layer of the separator thus obtained had a thickness of 1.0 μm, an area density of 0.035 mg/cm², and a porosity of 65.7%. In addition, the air permeability of the separator including the surface layer was 586 sec/100 ml.

Comparative Example 1-7

Except that an ethylene (Et)-vinyl alcohol (VA) copolymer (44 percent by mole of ethylene, manufactured by Sigma-Aldrich Co.) was used instead of using the copolymer of Example 1-1; dimethyl sulfoxide was used instead of using N-methyl-2-pyrrolidone; and the surface layer was formed using a resin solution in which the above ethylene (Et)-vinyl alcohol (VA) copolymer was dissolved at a concentration of 5.0 percent by mass, a separator having a total thickness of 18.0 μm was formed using a method similar to that in Example 1-1.

The surface layer of the separator thus obtained had a thickness of 2.0 μm, an area density of 0.043 mg/cm², and a porosity of 67.4%. In addition, the air permeability of the separator including the surface layer was 853 sec/100 ml.

Comparative Example 1-8

A porous resin film having a structure similar to that of the substrate of Example 1-1 was used as the separator without providing the surface layer. The area density of the separator was 0.978 mg/cm², the porosity was 36.3%, and the air permeability was 440 sec/100 ml.

Reference Example 1-1

A porous polyethylene resin film (E16MMS, manufactured by Tonen Chemical Corporation) having a thickness of 16 μm, which was formed by a so-called wet method (that is, biaxial drawing was used as a drawing method), was used as the separator. The area density of the separator was 0.983 mg/cm², the porosity was 36.0%, and the air permeability was 304 sec/100 ml.

[Evaluation of Separator]
(a) Tear Test

As in Reference Examples 1 to 5, the tear forces of Examples, Comparative Examples, and Reference Example 1-1 were measured, and the tear strengths were calculated. In addition, the slit was formed in a direction parallel to the drawing direction of the test sample, that is, in a direction in which the slit was likely to be torn when being pulled in the drawing direction.

Figure 13:
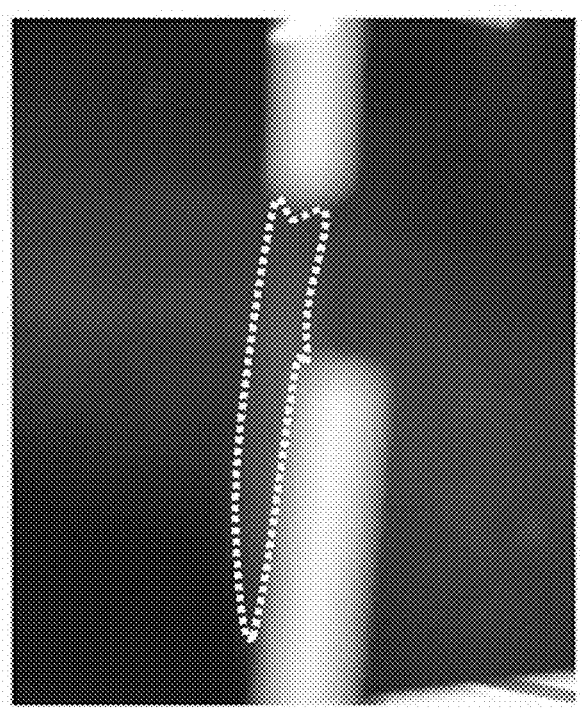
FIG. 13 is a photograph showing the state in which the tear test is performed in Example 1-1.

FIG. 12 shows the state of the separator of Example 1-1 at the time of the tear test. FIG. 13 shows the state after the substrate of the separator of Example 1-1 is torn. In FIG. 13, a part shown by a white color indicates the substrate, and a part shown by a pale white color and surrounded by a white dotted line indicates the surface layer.

Figure 14A:
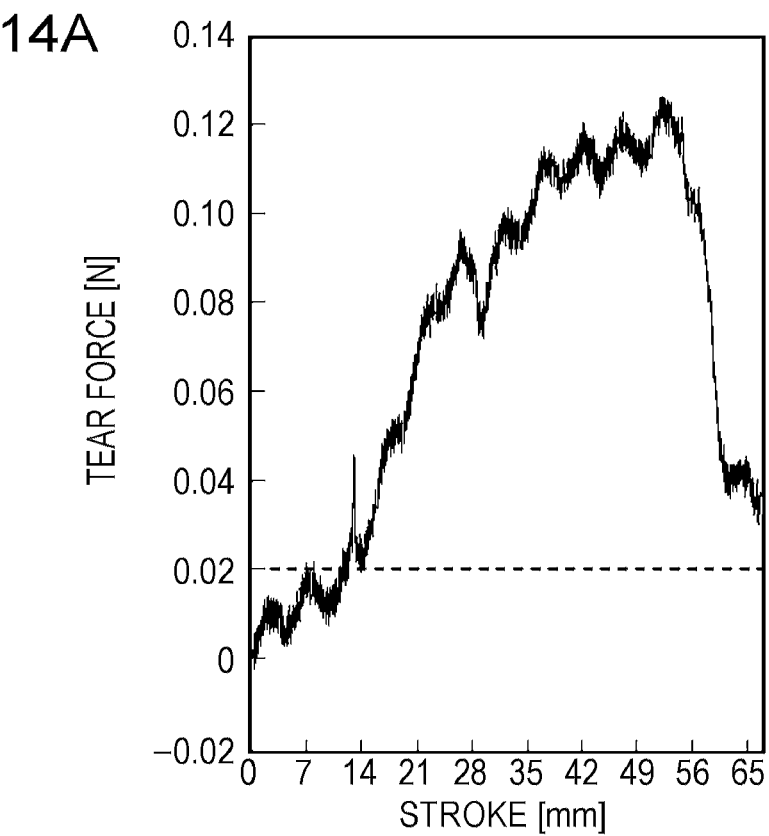
FIG. 14A is a graph showing the change in tear force from tear initiation to separator fracture in the tear test performed in Example 1-1.
Figure 14B:
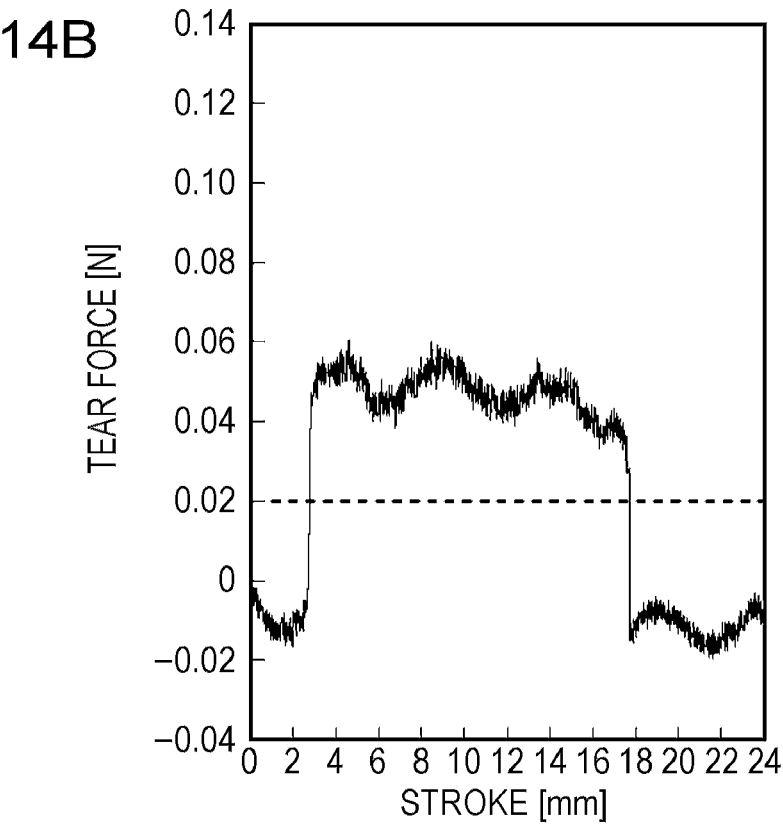
FIG. 14B is a graph showing the change in tear force from tear initiation to separator fracture in the tear test performed in Reference Example 1-1.

In addition, FIGS. 14A and 14B are graphs each showing the change in tear force from tear initiation to separator fracture during the tear test of Example 1-1 and Reference Example 1-1, respectively.

The evaluation results of Examples, Comparative Examples, and Reference Example are shown in the following Table 2.

|  | SUBSTRATE | | | | SURFACE LAYER | |
|---|---|---|---|---|---|---|
|  | MATERIAL | MANUFACTURING METHOD | STRUCTURE | THICKNESS [μm] | RESIN MATERIAL/ CONSTITUENT MONOMER | RESIN CONCENTRATION [PERCENT BY MASS] |
| EXAMPLE 1-1 | POLYPROPYLENE POLYETHYLENE | DRY METHOD | PP/PE/PP | 16.0 | VdF-TFE-HFP | 5.0 |
| EXAMPLE 1-2 | | | | | | 6.0 |
| EXAMPLE 1-3 | | | | | | 7.0 |
| EXAMPLE 1-4 | | | | | | 8.0 |
| EXAMPLE 1-5 | | | | | | 10.0 |
| EXAMPLE 1-6 | | | | | | 5.0 |
| EXAMPLE 1-7 | | | | | | 6.0 |
| COMPARATIVE EXAMPLE 1-1 | POLYPROPYLENE POLYETHYLENE | DRY METHOD | PP/PE/PP | 16.0 | VdF-MMM | 5.0 |
| COMPARATIVE EXAMPLE 1-2 | | | | | VdF-HFP-MMM | 5.0 |
| COMPARATIVE EXAMPLE 1-3 | | | | | VdF | 5.0 |
| COMPARATIVE EXAMPLE 1-4 | | | | | | 6.0 |

-continued

| | | | | | |
|---|---|---|---|---|---|
| COMPARATIVE EXAMPLE 1-5 | | | | VdF | 5.0 |
| COMPARATIVE EXAMPLE 1-6 | | | | VA | 5.0 |
| COMPARATIVE EXAMPLE 1-7 | | | | Et-VA | 5.0 |
| COMPARATIVE EXAMPLE 1-8 | | | | — | — |
| REFERENCE EXAMPLE 1-1 | POLYETHYLENE | WET METHOD | PE | 16.0 | — | — |

| | SURFACE LAYER | | | TOTAL THICKNESS [μm] | AIR PERMEABILITY [sec/100 ml] | TEAR STRENGTH [N/cm] |
|---|---|---|---|---|---|---|
| | THICKNESS [μm] | AREA DENSITY [mg/cm²] | POROSITY [%] | | | |
| EXAMPLE 1-1 | 1.4 | 0.094 | 65.2 | 17.4 | 471 | 15.4 |
| EXAMPLE 1-2 | 1.6 | 0.113 | 63.4 | 17.6 | 466 | 27.8 |
| EXAMPLE 1-3 | 1.8 | 0.126 | 63.7 | 17.8 | 491 | 30.4 |
| EXAMPLE 1-4 | 1.7 | 0.122 | 62.8 | 17.7 | 470 | 37.3 |
| EXAMPLE 1-5 | 2.1 | 0.193 | 52.4 | 18.1 | 530 | 76.2 |
| EXAMPLE 1-6 | 1.2 | 0.063 | 72.8 | 17.2 | 450 | 13.2 |
| EXAMPLE 1-7 | 0.5 | | 34.7 | 16.5 | 445 | 12.6 |
| COMPARATIVE EXAMPLE 1-1 | 3.3 | 0.096 | 83.4 | 19.3 | 561 | 12.4 |
| COMPARATIVE EXAMPLE 1-2 | 1.2 | 0.159 | 24.3 | 17.2 | x | 14.8 |
| COMPARATIVE EXAMPLE 1-3 | 2.8 | 0.120 | 75.5 | 18.8 | 536 | 10.6 |
| COMPARATIVE EXAMPLE 1-4 | 1.4 | 0.124 | 49.4 | 17.4 | x | 13.2 |
| COMPARATIVE EXAMPLE 1-5 | 2.1 | 0.076 | 79.3 | 18.1 | 509 | 11.6 |
| COMPARATIVE EXAMPLE 1-6 | 1.0 | 0.035 | 65.7 | 17.0 | 586 | 11.7 |
| COMPARATIVE EXAMPLE 1-7 | 2.0 | 0.043 | 67.4 | 18.0 | 853 | 12.8 |
| COMPARATIVE EXAMPLE 1-8 | — | — | — | 16.0 | 440 | 12.5 |
| REFERENCE EXAMPLE 1-1 | — | — | — | 16.0 | 304 | 37.5 |

As apparent from Table 2, compared to Comparative Example 1-8 in which the porous resin film formed by a dry method was used as the separator, in each Example in which the surface layer was formed using a vinylidene fluoride (VdF)-tetrafluoroethylene (TFE)-hexafluoropropylene (HFP) copolymer, the tear strength was improved while an increase in air permeability was suppressed. The reason for this is that since the surface layer is not likely to be torn, even if the substrate is fractured, the surface layer is elongated.

In particular, Examples in which the thickness of the surface layer is 1 μm or more are preferable since the tear strength is more improved. In addition, when the porosity of the surface layer is in a range of 35% to 70%, it is preferable since the tear strength is more improved. Furthermore, as in the case of Example 1-7, it may be considered that when the porosity of the surface layer is lower than that of the substrate, the ion permeability is disadvantageously decreased in some cases.

On the other hand, in Comparative Examples 1-2 and 1-4 among Comparative examples 1-1 to 1-7—in which the surface layer was provided using a different resin material from that of the surface layer of Examples, although the tear strength was improved, the surface layer was formed into a film, and hence, the air permeability could not be measured. In this case, it may also be considered that when the above surface layer is used as the separator, the ion permeability is remarkably decreased or may not be obtained at all.

In addition, in Comparative Examples 1-1, 1-3, and 1-5 to 1-7, although the air permeability was not unmeasured, the tear strength was not improved as compared to that of Examples 1-1 and 1-6 in which the surface layer was formed at the same resin concentration as that of the above Comparative Examples. In addition, some separators had an inferior tear strength as compared to that of Comparative Example 1-8 in which the separator was formed only using the substrate. The reason for this is that since the effect of improving a tear strength of the surface layer is small or is almost nothing, the tear strength, that is, the tear force per unit thickness, is decreased.

Furthermore, with reference to the results of Reference Example 1-1, it was found that when the surface layer formed using a vinylidene fluoride (VdF)-tetrafluoroethylene (TFE)-hexafluoropropylene (HFP) copolymer was provided, the tear strength could be made similar to that obtained by a related wet method. In addition, when the concentration of the copolymer concentration in the resin solution was increased, a separator having a higher tear strength than that obtained in Reference Example 1-1 could be formed.

As shown in FIG. 14B, the separator of Reference Example 1-1 was progressively torn by an approximately constant tear force after the tear initiation, and when the tear was completed, that is, when the separator was fractured, the tear force was decreased to approximately zero. On the other hand, as shown in FIG. 14A, in the case of the separator of Example 1-1, as the test was advanced, the tear force was increased. The reason for this is that even when the substrate was torn, the surface layer was elongated. In addition, in FIG. 14A, after reaching the peak, the tear force was gradually decreased. The above phenomenon occurred since the substrate was completely fractured; however, the fact in that the tear force was gradually decreased indicates that even after the substrate was fractured, the surface layer was elongated, so that the separator was not in a completely fractured state.

In addition, in Comparative Example 1-8, since the tear strength was 12.5 [N/cm], the tear force of the separator having a thickness of 16.0 μm shown in Comparative Example 1-8 was 12.5×16.0×10$^{-4}$=0.02 [N]. This is the tear strength of the substrate itself of Examples 1-1 to 1-7. From FIG. 14A, it was found that the separator of Example 1-1 of the present disclosure compensated the tear force of the separator of Comparative Example 1-8 formed by a dry method and had a high tear strength.

Example 2-1 and Comparative Examples 2-1 and 2-2

In Example 2-1 and Comparative Examples 2-1 and 2-2, improvement in properties of a separator in which a surface layer containing a ceramic was provided on one surface of the substrate was evaluated.

Example 2-1

To a resin solution in which a vinylidene fluoride (VdF)-tetrafluoroethylene (TFE)-hexafluoropropylene (HFP) copolymer similar to that of Example 1-1 was dissolved at a concentration of 5.03 percent by mass, fine alumina particles ($Al_2O_3$, AKP-3000, manufactured by Sumitomo Chemical Co., Ltd.) having an average particle diameter of 500 nm was added as a ceramic. The alumina was added so that the mass ratio thereof to the above copolymer was 70 to 30 (=alumina to copolymer) and was further stirred using a bead mill, thereby forming a coating slurry. The concentration of the vinylidene fluoride (VdF)-tetrafluoroethylene (TFE)-hexafluoropropylene (HFP) copolymer in the coating slurry was 4.5 percent by mass, and the total content of the vinylidene fluoride (VdF)-tetrafluoroethylene (TFE)-hexafluoropropylene (HFP) copolymer and the alumina was 15.0 percent by mass. Except that the surface layer was formed using this coating slurry, a separator having a total thickness of 20.9 μm was obtained using a method similar to that in Example 1-1.

The surface layer of the separator thus obtained had a thickness of 4.9 μm and an area density of 0.600 mg/cm$^2$, and the air permeability of the separator including the surface layer was 471 sec/100 ml. In addition, after N-methyl-2-pyrrolidone in the coating slurry was removed in a surface layer forming step, the content of the ceramic in the surface layer was 70 percent by mass.

Comparative Example 2-1

Except that instead of using the vinylidene fluoride (VdF)-tetrafluoroethylene (TFE)-hexafluoropropylene (HFP) copolymer, a vinylidene fluoride-hexafluoropropylene (HFP)-maleic monomethyl ester (MMM) copolymer (KF polymer W#9300, manufactured by Kureha Chemical Industry Co., Ltd) was used, a separator having a total thickness of 23.9 μm was formed in a manner similar to that in Example 2-1.

The surface layer of the separator thus obtained had a thickness of 7.9 μm and an area density of 0.523 mg/cm$^2$, and the air permeability of the separator including the surface layer was 508 sec/100 ml.

Comparative Example 2-2

As in the case of Comparative Example 1-8, a porous resin film having a structure similar to that of the substrate of Example 1-1 was used as the separator. The air permeability of the separator was 440 sec/100 ml.

[Evaluation of Separator]
(a) Tear Test

The tear force of each of Example and Comparative Examples was measured as in the case of Example 1, and the tear strength was then calculated.

The evaluation results of Example 2-1 and Comparative Examples 2-1 and 2-1 are shown in the following Table 3.

|  | SUBSTRATE | | | SURFACE LAYER | | |
| --- | --- | --- | --- | --- | --- | --- |
|  | MANUFACTURING METHOD | STRUCTURE | THICKNESS [μm] | RESIN MATERIAL/ CONSTITUENT MONOMER | RESIN CONCENTRATION [PERCENT BY MASS] | CERAMIC |
| EXAMPLE 2-1 | DRY METHOD | PP/PE/PP | 16.0 | VdF-TFE-HFP | 4.5 | ALUMINA |
| COMPARATIVE EXAMPLE 2-1 | DRY METHOD | PP/PE/PP | 16.0 | VdF-HFP-MMM | 4.5 | ALUMINA |
| COMPARATIVE EXAMPLE 2-2 | — | — | — | — | — | — |

|  | SURFACE LAYER | | | | | |
| --- | --- | --- | --- | --- | --- | --- |
|  | CERAMIC CONTENT (PERCENT BY MASS) | THICKNESS [μm] | AREA DENSITY [mg/cm$^2$] | TOTAL THICKNESS [μm] | AIR PERMEABILITY [sec/100 ml] | TEAR STRENGTH [N/cm] |
| EXAMPLE 2-1 | 70 | 4.9 | 0.600 | 20.9 | 471 | 31.1 |
| COMPARATIVE EXAMPLE 2-1 | 70 | 7.9 | 0.523 | 23.9 | 508 | 10.9 |
| COMPARATIVE EXAMPLE 2-2 | — | — | — | 16.0 | 440 | 12.5 |

As apparent from Table 3, in the case in which a separator including a surface layer containing a ceramic, such as alumina, was formed in order to improve heat resistance, oxidation resistance, and the like as in Example 2-1, when the surface layer was formed using the vinylidene fluoride (VdF)-tetrafluoroethylene (TFE)-hexafluoropropylene (HFP) copolymer according to the embodiment of the present disclosure, the tear strength could also be improved.

In addition, as in Comparative Example 2-1, when the surface layer was formed using a copolymer different from that of Example 2-1, the tear strength was decreased as compared to that of the separator of Comparative Example 2-2 in which the surface layer was not provided.

Hence, even if the surface layer containing a ceramic is formed, in order to improve the tear strength, the copolymer according to the embodiment of the present disclosure is preferably used.

Heretofore, although the present disclosure has been described with reference to the embodiments and examples, the present disclosure is limited thereto and may be variously modified without departing from the scope of the present disclosure. For example, when a porous film is used as a battery separator, the thickness of the porous film and the composition of each material may be appropriately determined in accordance with the compositions of the positive and negative electrodes. In addition, the nonaqueous electrolyte battery may also be a primary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A separator comprising:
   a substrate including a porous film; and
   a porous surface layer which is provided on at least one surface of the substrate, wherein the porous surface layer consists essentially of a vinylidene fluoride-tetrafluoroethylene-hexafluoropropylene copolymer,
   wherein a porosity of the porous surface layer is 35% or more and less than or equal to 52.4%,
   wherein a content of a monomer unit derived from the hexafluoropropylene in the porous surface layer is in a range of 5 to 15 percent by mole in the copolymer, a content of a monomer unit derived from the tetrafluoroethylene in the porous surface layer is in a range of 10 to 40 percent by mole in the copolymer, and a content of the monomer unit derived from the vinylidene fluoride in the porous surface layer is in a range of 45 to 85 percent by mole in the copolymer, and
   wherein a thickness of the porous surface layer is 1.0 μm to 2.1 μm.

2. The separator according to claim 1,
   wherein the porous film is a film which contains a resin material and which is drawn in a uniaxial direction.

3. The separator according to claim 1,
   wherein the porous surface layer has a fibrillated three-dimensional network structure.

4. The separator according to claim 1,
   wherein the porosity of the porous surface layer is higher than a porosity of the substrate.

5. The separator according to claim 1, wherein the porosity of the substrate ranges from 35% to 50%.

6. A nonaqueous electrolyte battery comprising:
   a positive electrode;
   a negative electrode;
   a nonaqueous electrolyte; and
   at least one separator,
   wherein the separator comprises:
      a substrate including a porous film; and
      a porous surface layer which is provided on at least one surface of the substrate, wherein the porous surface layer consists essentially of a vinylidene fluoride-tetrafluoroethylene-hexafluoropropylene copolymer, and
   wherein a porosity of the porous surface layer is 35% or more and 52.4% or less,
   wherein a content of a monomer unit derived from the hexafluoropropylene in the porous surface layer is in a range of 5 to 15 percent by mole in the copolymer, a content of a monomer unit derived from the tetrafluoroethylene in the porous surface layer is in a range of 10 to 40 percent by mole in the copolymer, and a content of the monomer unit derived from the vinylidene fluoride in the porous surface layer is in a range of 45 to 85 percent by mole in the copolymer, and
   wherein a thickness of the porous surface layer is 1.0 μm to 2.1 μm.

7. The nonaqueous electrolyte battery according to claim 6,
   wherein the positive electrode and the negative electrode are laminated and wound with the at least one separator provided therebetween to form a wound electrode body.

8. A battery pack comprising:
   the nonaqueous electrolyte battery according to claim 6;
   a control section controlling the nonaqueous electrolyte battery; and
   an exterior package enclosing the nonaqueous electrolyte battery.

9. An electronic apparatus comprising:
   the nonaqueous electrolyte battery according to claim 6,
   wherein the nonaqueous electrolyte battery supplies an electric power.

10. An electric vehicle comprising:
    the nonaqueous electrolyte battery according to claim 6:
    a converter converting an electric power supplied therefrom into a driving force of a vehicle; and
    a control device which performs information processing relating to vehicle control based on information relating to the nonaqueous electrolyte battery.

11. An electric power storage device comprising:
    the nonaqueous electrolyte battery according to claim 6,
    wherein the electric power storage device supplies an electric power to an electronic apparatus connected to the nonaqueous electrolyte battery.

12. The electric power storage device according to claim 11,
    further comprising an electric power information control device which transmits and receives a signal to and from another apparatus through a network,
    wherein based on information received by the electric power information control device, the electric power storage device performs charge/discharge control of the nonaqueous electrolyte battery.

13. An electric power system comprising:
    the nonaqueous electrolyte battery according to claim 6,
    wherein the nonaqueous electrolyte battery supplies an electric power or receives an electric power from a power generator or a power network.

* * * * *